United States Patent [19]

Henegar et al.

[11] 3,746,845

[45] July 17, 1973

[54] NUMERICAL CONTROL SYSTEM

[75] Inventors: Hubert B. Henegar; Robert J. Patterson, both of Detroit, Mich.

[73] Assignee: The Bendix Corporation, Southfield, Mich.

[22] Filed: Aug. 6, 1970

[21] Appl. No.: 62,244

[52] U.S. Cl. ................................ 235/151.11, 444/1

[51] Int. Cl. ............................................ G05b 15/02

[58] Field of Search ............................... 235/151.11; 340/172.5

[56] References Cited

UNITED STATES PATENTS

| | | | |
|---|---|---|---|
| 3,634,662 | 1/1972 | Slawson | 235/151.11 |
| 3,699,317 | 10/1972 | Middleditch | 444/1 X |
| 3,253,438 | 5/1966 | Stringer | 72/12 |
| 3,298,001 | 1/1967 | Couleur et al. | 340/172.5 |

*Primary Examiner*—Eugene G. Botz
*Attorney*—William F. Thornton, Milton & Ethington, McGlynn and Reising and Plante, Hartz, Smith and Thompson

[57] ABSTRACT

A numerical control system for controlling the motion of a movable member wherein part program and other data flows throughout the system under control of a programmable digital processor. Selected devices present interrupt signals indicating data flow conditions according to an order of priority determined by external wiring; the highest priority being assigned to part program reading and the lowest priority being assigned to the scanning of certain hard contacts such as control panel switches. Interface logic between input and output devices and the processor is disclosed.

37 Claims, 23 Drawing Figures

INVENTORS
Hubert B. Henegar &
BY Robert J. Patterson

Barnard, McGlynn & Reising
ATTORNEYS

INVENTORS
Hubert B. Henegar
BY Robert J. Patterson
Barnard, McGlynn & Reising
ATTORNEYS INVENTORS
Hubert B. Henegar &
BY Robert J. Patterson
Barnard, McGlynn & Reising
ATTORNEYS INVENTORS
Hubert B. Henegar &
BY Robert J. Patterson
Barnard, McGlynn & Reising
ATTORNEYS INVENTORS
Hubert B. Henegar &
BY Robert J. Patterson
Barnard, McGlynn & Reising
ATTORNEYS INVENTORS
Hubert B. Henegar &
BY Robert J. Patterson
Barnard, McGlynn & Reising
ATTORNEYS INVENTORS
Hubert B. Henegar &
BY Robert J. Patterson
Barnard, McGlynn & Reising
ATTORNEYS INVENTORS
Hubert B. Henegar &
BY Robert J. Patterson Barnard, McGlynn & Reising
ATTORNEYS INVENTORS
Hubert B. Henegar &
BY Robert J. Patterson
Barnard, McGlynn & Reising
ATTORNEYS

NUMERICAL CONTROL SYSTEM

This invention relates to the numerical control of displaceable elements and members of the type found in drilling machines, milling machines, drafting machines, plotters, lathes, systems for electron writing and the like, and particularly to an improved control system for such devices including a programmable digital processor. Although the invention is described with respect to a numerically controlled machine tool this is done for convenience only as the inventive concepts and features are equally applicable to any of the types of systems mentioned hereinabove. Accordingly, as used herein the terms "element" and "member" include cutting tools, pens, scribers, electron beams, and other elements the controlled movement of which results in a desired result.

Numerical control systems for devices of the type mentioned above have become well known for reading and executing prearranged data defining the prescribed displacements of the controlled element or elements. In these systems a desired profile is defined with respect to coordinate axes and the movement of the element controlled so that its motion traces the desired profile. For example, the final configuration of a part is programmed and the movement of the cutting tool controlled so that a part having the desired configuration is cut. In like manner, a desired electron trace on a screen can be programmed and the deflection of electrons between an electron source and the screen controlled so that the desired trace is achieved. Possibly the currently best known system is that for controlling a multiaxial milling machine in accordance with a "part program" which is carried by and read from a paper or plastic tape. Although other media for data storage are usable, an eight-channel tape with BCD digits defined by punched holes is quite common.

The prior art control system responds to the part program in a predetermined manner to cause the data defining the part, i.e., the movements of the tool relative to the workpiece, to flow toward the ultimate control device, usually a servomechanism. The response of the control system to part program data is determined substantially exclusively by hardware design and location. This is due to the fact that each signal path is essentially "hard wired". Thus, to produce a variation in system responses to data or to adapt a controller from one controlled device to another generally requires a substantial amount of hardware redesign and reconstruction. This revision is ordinarily expensive and time consuming.

In accordance with the present invention, a numerical control system is provided in which the data defining the controlled element movements, i.e., the part program, is causd to flow in a systemmatic fashion to the control mechanisms but in which system responses and peripheral data inputs may be readily altered. In general, this is accomplished by the use of a programmable digital computer, hereinafter called a "processor" to control the flow of the part program data to the control mechanism. The processor is programmable to perform such data transfer operations as part program character reading and the scanning of switches bearing an input relation to the processor according to a control program which is subject to alteration as suits the particular application.

In a specific embodiment of the invention, all data defining controlled element displacement characteristics flows through the processor such that the part program is carried out according to the control program in the processor. This involves the transfer of data to and from peripheral devices such as a tape reader, interpolators, and panel switches in accordance with a priority order which places some data transfer and management tasks on a higher level than others. In general, this is accomplished by operating the processor in an interrupt mode wherein certain peripheral devices which take part in data transfer are recognized and serviced according to a preassigned order of priority.

In the preferred embodiment of the invention, certain peripheral devices hereinafter called interrupting are provided with the ability to produce an interrupt signal when the need for a data flow to or from that device exits. Moreover, these interrupt signals are routed to the processor in an "anonymous" form; i.e., the interrupt signal does not identify the device from which it comes. The processor responds to the interrupt by interrogating the devices capable of generating interrupt signals. This interrogation takes place in an order which determines the priority order for servicing the interrupting devices and, moreover, progresses only as far as necessary to indentify a device which has produced an interrupt signal. After identifying the highest priority, currently active interrupting device, the processor enters a subroutine defined in the control program to perform those operations required to move data toward the servomechanism to produce the desired end result. Once a subroutine has been accomplished, processor operation control returns to the control program which determines whether any anonymous interrupt signal condition still exists. If it does, another interrogation is made and another subroutine is entered to service the identified device. If it does not, the subroutines not called by an interrupt signal are entered according to an order of priority until processor operation finally descends to a lowest priority task such as non-interrupt contact scanning.

According to another feature of the illustrated embodiment of the invention, the lowest priority task of the control system is the scanning of input data devices in the form of position-maintaining switches such as toggle and thumbwheel switches, and other hard-contact devices, the data from which is transferred to processor storage for further reference or transfer purposes. The operation of the system often descends to this level and may even "idle" there for the short period until an interrupt signal is received from some other device. The data from such position-maintaining switches is transferred to storage, for example, so as to be available for reference by the processor to interpret and direct additional data from other input devices. As an example, a rotatable thumbwheel switch may be set at X-axis position to indicate that subsequent numerical information entered via push buttons is to be effective to "manually" direct only the X-axis hardware components. The computer stores the thumbwheel switch data and refers to it to determine the "address" or destination of the numerical data.

In accordance with the invention, push button and other types of temporary position switches, i.e., those which open upon release of manual pressure, are equipped with the interrupt capability. Thus, the operator is assured that the data entered by such switches is properly input to the computer.

As a further feature of the invention, all switches and hard contact data input devices are grouped for sequenced scanning purposes by way of computer-generated signals. The groups are constituted so as to identify each switch in a group with an individual data line in the processor input channel thus to provide a parallel, fixed identification transfer of several switch data bits as a standard read operation. Assuming an input bus of eight parallel conductors to transfer eight bits of data in parallel, the switches are arranged into groups of eight, each group being treated as a unique source device the data from which is input in a fixed sequence by means of clock signals and input logic. This has the advantage of minimizing the number of input signal level conversion circuits, hereinafter referred to as "line receivers", required to interface such input devices with the processor and also establishes switch identities by the address of the interrupting device (group) and input line number.

In accordance with a still further feature of the invention, all temporary and position-maintaining switches are connected as input devices to the digital computer and result in the transfer of data to memory. The memory is preferably non-volatile such that the storage is semi-permanent, i.e., fixed until rewritten. Accordingly, input data which affects the part program execution may be called into play simply by entering the code of such data by way of temporary and position-maintaining switches. For example, tool offsets, which are normally entered by an extensive bank of thumbwheel switches, may be entered into memory simply by setting one position-maintaining switch to the desired axis setting and punching in the numerical code for the offset by way of temporary switches on a keyboard. Once this data is entered into memory, the switches may be reset and used to enter other data for other purposes whereas in prior art, nonprogrammable systems, such offset data switches must be left set for as long as the desired offset is to be in effect.

In accordance with another feature of the invention, an accumulated count of the total commanded position of the movable element along each controllable axis of displacement is maintained in a substantially current state but without devoting inordinate processor time to controlling the flow of this data. This is accomplished by employing internal computer storage for the total commanded counts but using relatively small-capacity external counters which are connected to receive directly the interpolator outputs. The external counters are emptied into the computer storage periodically by a clock signal, the frequency of which is high enough to prevent the small external counters from overflowing, but low enough to permit operation of the clock as an interrupting device and to maintain the data display, if any, substantially continuous.

Another feature of the invention is the standardization of feedrate control hardware without the loss of variable feedrate format capability. In general, this is accomplished by providing one or more feedrate subroutines which can be executed by the computer in response to the feedrate number data to provide the desired feedrate control characteristics. In the preferred embodiment, a feedrate commanded from the part program is input to a subroutine in the control program to produce a feedrate number in accordance with the desired format; e.g., direct inches per minute. The calculated feedrate number is employed to produce pulses at a rate proportional to the number, these pulses being applied as an add command to conventional DDA interpolators along with a binary number input.

Another feature of the invention is a means by which certain hardware and software failures are detected in a very short time. This includes a counter which receives clock pulses preferably from an external source and at a selected rate and which overflows if not cleared by an external signal within a time interval determined by counter capacity and clock rate. This external signal is obtained from the processor output bus such that the failure of the system to produce an output signal to one of the devices on the output channel within the time interval is taken as a malfunction indicator.

Many other features and advantages of the invention will become apparent upon reading the following specification of an illustrative and preferred embodiment. As a specific example of such features, one may provide an addressable subroutine in memory which always causes the tool to assume a predetermined reference position such as a tool change position. The existence of the subroutine obviates the need for extensive hardware to produce the desired displacement and permits the desired result to be accomplished either by automatic institution of a tool displacement routine which is terminated by a limit switch subroutine interrupt, or by reference to current tool position as stored in memory and calculation of the necessary axial displacements to attain the reference position. Another such feature is the facilitation of sequence number searching by means of an addressable subroutine. This permits computer control of a block search by means of tape reader device control connections which exist for normal function execution and, thus, reduces external hardware requirements.

It is to be understood that unless otherwise clarified herein, the refernce to "tool displacement" is to be taken in the broader sense of relative displacement between a tool and a work piece bed; such displacement can be accomplished along or about several axes by actual displacement of the tool, bed, or both.

The following specification is to be taken with the accompanying drawings of which:

Figure 6:
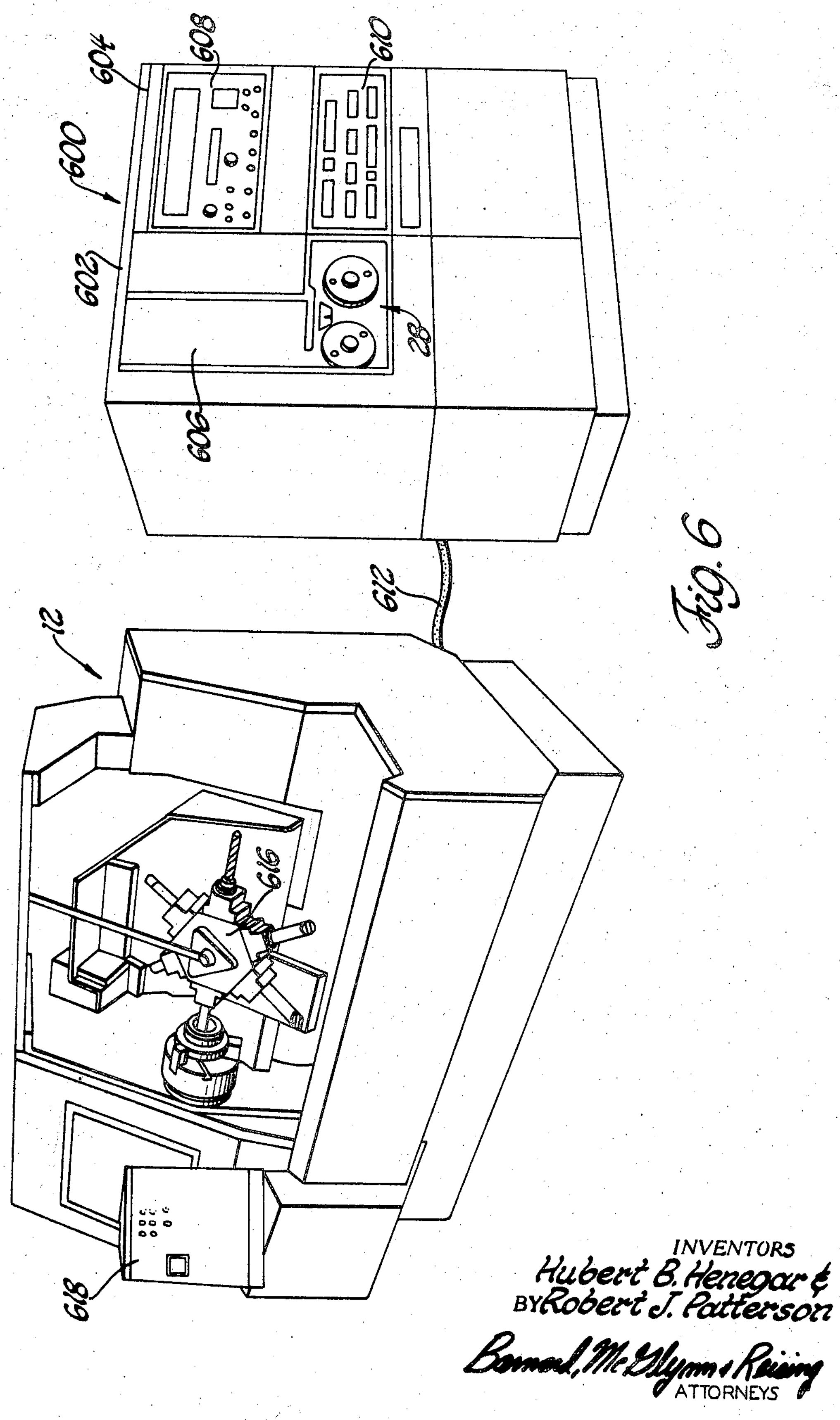
Figure 7:
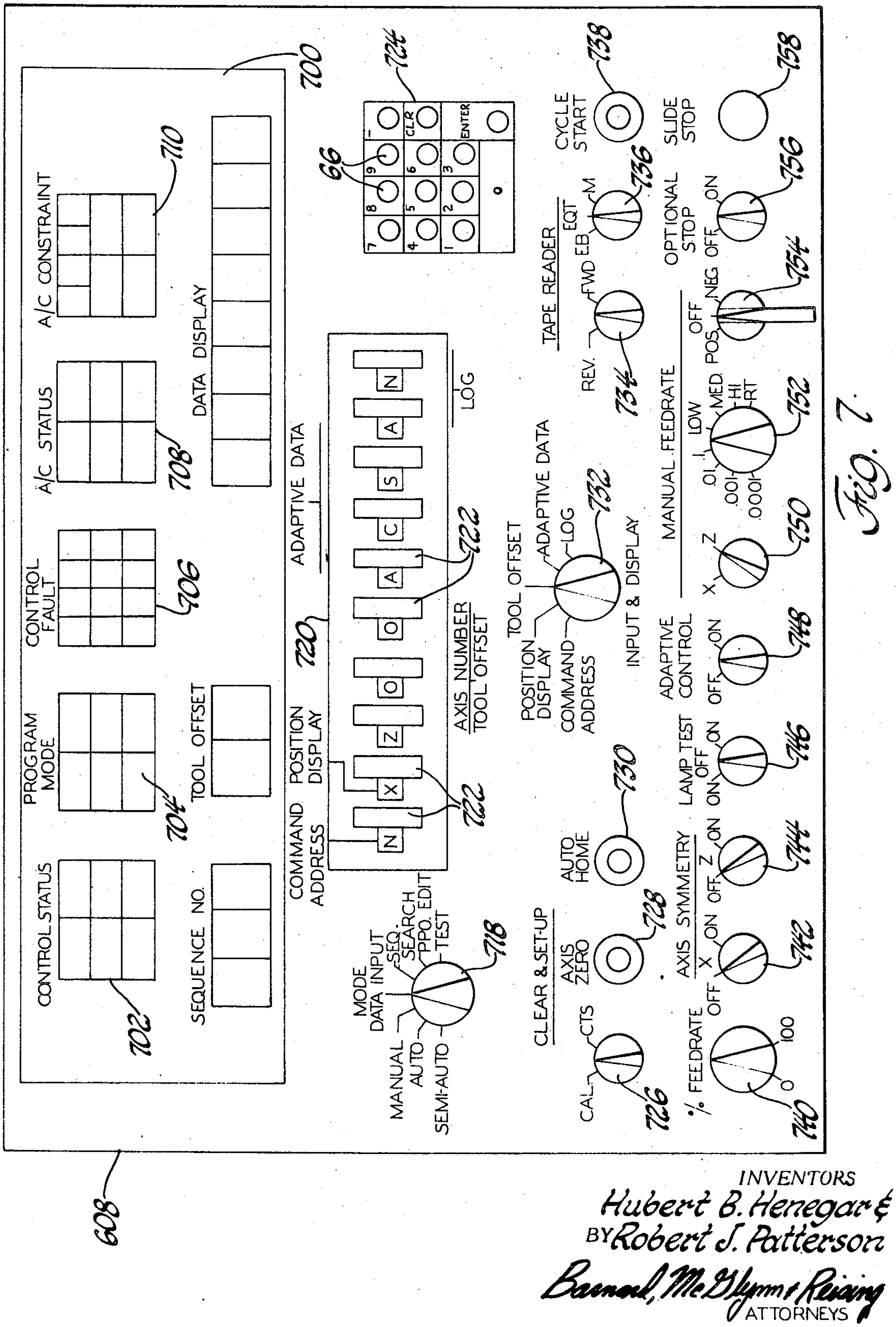

FIG. *5a–5n* is a group of flow charts of certain subroutines in the control program;

FIG. 6 is a perspective view of a preferred packaging arrangement; and,

FIG. 7 is a detailed view of the panels on the console of FIG. 6.

FIGURE 1

Figure 1:
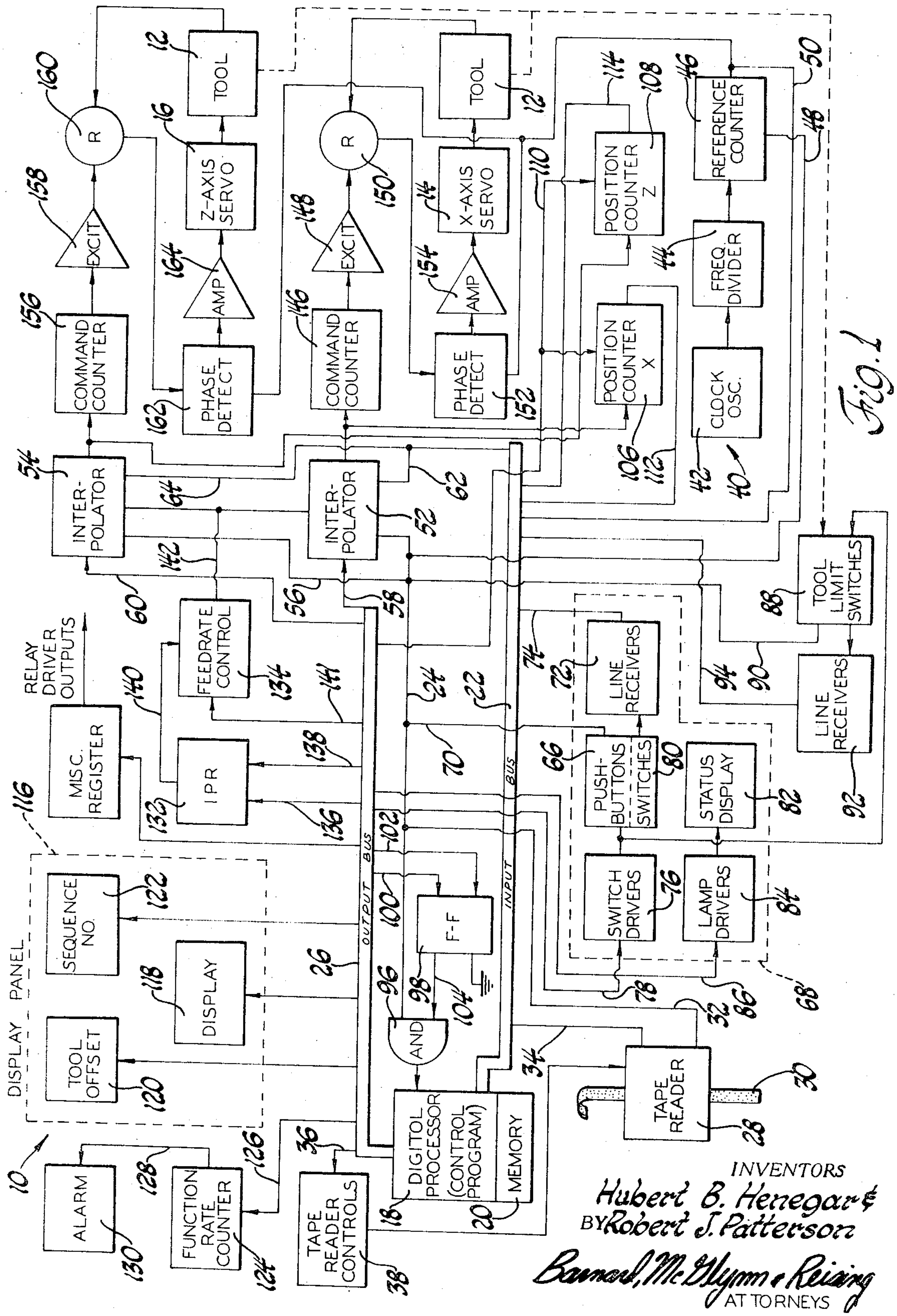
FIG. 1 is an overall block diagram of the illustrative embodiment.

Referring to FIG. 1, there is shown a numerical control system 10 for automatically controlling the operation of a machine tool 12 having X and Z axis servo mechanisms 14 and 16 to control the relative positions of the tool 12 and a workpiece or bed for such a workpiece along mutually perpendicular axes. In the example of FIG. 1, a two-axis tool 12 such as a lathe is presumed; however, it is to be understood that any number of servo-controlled axis of displacement may be employed simply by extension of the principles and apparatus hereinafter explained. Accordingly, the invention is equally applicable to more complicated machinery such as five-axis milling machines.

Numerical control system 10 comprises a general purpose programmable digital processor 18, generally called a computer, which operates in accordance with a control program to execute system functions by way of various input and output devices to be described. Processor 18 is equipped with a non-volatile memory 20 such as magnetic cores, magnetic films, drums, discs and combinations of such memory devices. Processor 18 is provided with an eight-line, parallel transfer input bus 22 by which the processor receives system device addresses and system function data. Processor 18 is further equipped with an interrupt line 24 by which signals are received from external devices to indicate the need for the transfer of data between devices or between the processor ad devices, such a condition hereinafter being referred to as a data-flow condition. Processor 18 is further provided with an eight-line, parallel transfer output bus 26 by way of which system device address data and system function data is communicated from the processor to the output devices hereinafter described. A suitable processor is the Micro 810 Computer available from Micro Systems Inc. of Santa Ana, Cal.

Digital processor 18 is implemented to operate in a priority-interrupt mode wherein an externally generated interrupt signal signifying the need for a data transfer causes a device search to be carried out and, upon identification of the highest priority interrupting device, the entering of one of several possible service routines. Each routine is a branch of a control program and is designed to perform the data management functions required by the characteristics of the interrupting device. Once that routine is completed, the control program establishes the condition for determining whether other interrupt signals exist. If they do exist, another device search is conducted and another service routine is called. If they do not exist, the program goes onto lower priority routines such as the scanning of hard-contact input devices such as panel switches. In general, the interrupt signal, a totally anonymous quantity, is conveyed to processor 18 via channel 24. Once recognized and acknowledged, the address of the interrupting device is ascertained and the service routine necessary to accomodate the interrupting device is entered. Only after the interrupting device has been serviced will the operation of processor 18 once again descend to lower priority subroutines.

A first interrupting device, and that device having the highest priority service subroutine in the control program, is the tape reader 26. This is a well-known electro-optical device for the reading of part program characters from a prepared tape 30 which defines, in standard BCD tape codes, the various parameters of the displacement of tool 12 which must be followed in order to produce from stock a part having the desired end qualities. It is to be understood that the electrooptical tape reader 28 for the reading of punched plastic tape 30 is only one of several part program reading means which may be employed. Part program data may be stored in various media, each medium having it own particular reader requirements. Moreover, a part program may be transferred entirely to a storage facility auxiliary to memory 20 from which it is read in increments. Tape reader 28 has an interrupt request line 32 connected to the external processor interrupt line 24 to advise the processor 18 of the readiness to read an additional part program character into buffer storage. Tape reader 28 is further provided with an input line set 34 which is connected to the input bus 22 for the purpose of transferring BCD coded part program characters to the memory 20 of digital processor 18. Finally, an output line set 36 is connected from the output bus 26 to the tape reader control unit 38 to permit transfer of those signals which control the starting and stopping of the tape in the well-known fashion.

A second interrupting device and the device receiving the second highest interrupt priority in accordance with the control program of processor 18 is the external clock unit 40. This unit comprises a basic clock oscillator 42 and intermediate frequency dividers 44 and 46 in the form of counters. The output of clock oscillator 42 is connected in parallel to both the divider 44 and divider 46 to produce from divider 46 a clock pulse train at a frequency of 250 pps or one pulse every four milliseconds. An output 48 of clock divider 46 is connected to the interrupt line 24 to produce an interrupt signal to the processor 18 every 4 milliseconds. Another output 50 from the reference counter 46 is connected to the input bus 22 to supply address information to the digital processor 18 when the device search is conducted. This address information identifies the clock as the interrupting device and calls a service routine from the control program to perform a data transfer as hereinafter described.

The interrupting devices which receive the third highest priority in the priority interrupt scheme are the part-program data interpolators 52 and 54. Interpolators 52 and 54 which are typically in the form of digital differential analyzers (DDAD's) respond to blocks of part-program data to produce command pulses of a number and at a rate called for by the part-program data on tape 30. When interpolators 52 and 54 are ready to receive and interpolate a new block of part-program data, such condition being indicated by the reading of an "end-of-interpolation" signal from the interpolators an interrupt signal is generated on interrupt line 56 which, as shown in FIG. 1, is connected directly to the processor interrupt line 24. In addition, the output bus 26 of processor 18 is connected by way of line 58 to the X axis interpolator 52 and by way of line 60 to the Z axis interpolator 54. As is well known to those of ordinary skill in the art, the interpolators 52 and 54 are preferably capable of both linear and circular interpolation. Interpolator 52 is provided with an input line 62 which is connected to the input bus 22 to advise the processor 18 of the address of the interpolator following the production of an interrupt signal on line 56. Similarly, interpolator 54 is provided with an address input line 64 which is connected to the line 62 from interpolator 52 since the processor 18 regards both interpolators as a single interrupting device as far as interrupt functions are concerned.

In the embodiment of FIG. 1, the interrupting device receiving the fourth highest interrupt priority designation is the set of manual input push buttons 66 which is located on the front of the control panel 68 of the system console shown in FIG. 6. The push buttons 66, as best shown in FIG. 7 are thirteen in number and are provided for the purpose of entering numerical data to the processor 18 such as for operation of the servo mechanisms 14 and 16 in a manual mode. Accordingly, data defining the tool position and thus the part geometry can be entered via the push buttons 66 as well as the tape reader 28. The push buttons 66 are of the temporary-position type, that is, once manual pressure is released the push buttons return to the open switch condition. Therefore, the depression of a push button 66 is preferably recognized by the generation of an interrupt. Accordingly, an interrupt output line 70 is connected between the push button set 66 and the interrupt line 24 of the processor 18 for the purpose of advising the processor 18 of the occurrence of the push-button depression. A combination of address and data information flows between the push buttons 66 and the processor 18 by way of a level-changing and transformer circuit in the form of a line receiver 72 having an output 74 connected to the input bus 22 and the processor 18. In addition, a switch driver circuit 76 is connected between the output bus 26 and the push button set 66 to apply operating potentials to the switches. Driver 76 includes a control line 78 as shown.

The push buttons 66 generally cooperate with a set of position-maintaining switches 80 such as thumbwheel switches, dials and other position-maintaining contact devices which are not equipped to produce an interrupt function. Switches 80 are driven by switch driver 76 and employ line receivers 72 for the purpose of connection to the input bus 22. However, because switches 80 are position maintaining in character, it is sufficient to permit the scanning of these switches for input data to be accomplished on a non-priority basis; which is to say that the control program of processor 18 is such that the scanning of switches 80 is assigned the lowest order of priority. Therefore, no interrupt function is necessary. However, generally stated, the function of switches 80 is to enter certain information into the memory 20 of processor 18, which information is referred to to determine the meaning or destination of data which is later entered by means of push buttons 66. An example is the entering of feedrate information which is specific to a particular axis. The designation of the particular axis might be entered by way of a suitable setting of one of the switches 80, and the actual feedrate number later entered by a depression of numeric push buttons 66. The numeric information is referenced by the processor 18 to the destination entered by way of switch 8 in order to select the proper channel to the particular servo-mechanism controlling the tool along the selected axis.

Control panel 68 is further provided with a Nixie tube status display set 82 driven by processor 18 through a lamp driver circuit 84 having a control line 86 which is connected to the output bus 26.

Another device having an interrupt capability but having the lowest priority rating among the devices with interrupt capabilities is a set of tool limit switches 88 which cooperate with the tool 12 to close certain contacts when the tool arrives at the predetermined position established by the physical location of the limit switches. Each limit switch is provided with an interrupt signal line 90 which is connected to the interrupt line 24 of processor 18. The data from tool limit switches 88 is input to the processor 18 by way of line receivers 92 and input lines 94 which are connected to the data input bus 22.

In accordance with the control program of processor 18, the interrupt signals which are applied to line 24 by the various interrupting devices to signal a data-flow condition are only accepted by processor 18 other than during the execution of an interrupt service subroutine. In the embodiment of FIG. 1, this is accomplished by connecting the interrupt line 24 to the processor 18 by way of coincidence gate logic including an AND gate 96. This gate 96 is either conductive or nonconductive to the interrupt signals on line 24 in acordance with the state of an interrupt control system including the bistable flip-flop device 98. Flip-flop device 98 produces either a high or low output signal depending upon the occurrence of set and reset signals on lines 100 and 102 which are controlled by the output bus 26. When flip-flop device 98 is set to the high or "on" condition by the occurrence of the signal on line 100, the high output line 104 is energized to enable the AND gate 96. Gate 96 is, thus, conductive to the interrupt signals. However, upon the occurrence of an interrupt signal which is received by processor 18, line 102 is energized to reset bistable flip-flop device 98 to the low condition. The signal on line 104 is, thus, extinguished and the AND gate 96 is no longer conductive to interrupt signals on line 24. During the disabled condition of gate 96, no interrupt signals will be received and, thus, the interrupt service subroutine currently under execution will be completed in its entirety before another interrupt signal is entertained even though that subsequent interrupt signal may be received from an interrupting device having a higher priority rating in the control program than the device causing the interrupt service subroutine currently in execution.

The system 10 further includes additional input and input/output devices which supply data to the processor 18 by way of the input bus 22. These input/output devices include X and Z position counters 106 and 108, respectively. Counters 106 and 108 are relatively small capacity counters which are loaded with pulses directly from the X and Z interpolators 52 and 54, respectively. Counters 106 and 108 are provided with a clock signal on line 110 which is connected from the output bus 26 to periodically transfer the contents of the counters by way of output line sets 112 and 114, respectively, to the input bus 22. The contents of the counters 106 and 108 are, thus, transferred to a storage position in memory 20 which represents an accumulated count of the command position of the tool 12 along the X and Z axes. The use of the external counters serves a buffer function to permit interpolated command signals to occur at the part program data flow rate but without the need for frequent attention from processor 18 to accomplish the transfer.

System 10 further includes additional output devices including a display panel 116 containing general display unit 118, offset display unit 120, and sequence number display unit 122 as will be further described hereinafter. The units 118, 120, and 122 are suitably connected to the output bus for the receipt of properly coded information pulses to provide displays of the current state of various instrumentalities in the system 10. Display panels 116 are commonly used in numerical control systems as will be apparent to those with ordinary skill in the art.

The output devices of system 10 further include a function rate counter 124 which, like counters 106 and 108, is a relatively small capacity counter which receives and stores clock signals from an external clock source, as shown. Function rate counter 124 is also provided with a reset input line 126 from the output bus 26 on which an output command appears to reset the counter 124 upon the occurrence of any return jump to the scheduler block 200 of the software diagram of FIG. 2. Should no such jump occur within a predetermined period of time as, for example, 100 milliseconds, the clock signals which are constantly being loaded into the counter 124 produce an overlow on line 128. Line 128 is connected into an alarm device 130 such as a bell, buzzer, or relay to indicate the probability of a hardware or software failure in the system 10.

The output devices of system 10 further include an inches per revolution or IPR control unit 132 which operates in conjunction with a feedrate control unit 134. IPR control unit is provided with start and stop signal lines 136 and 138 which are connected to the output bus 26, and an output signal line 140 which is connected to the feedrate control unit 134. Feedrate control unit 134 is provided with an independent data transfer line 141 which is connected to the output bus 26 for the transfer of numeric data to the feedrate control unit 134. As is well known to those of ordinary skill in the art, the part program information on tape 30 when read by tape reader 28 generally contains a feedrate number which is processed by the computer 18 and transferred to the feedrate control unit 134. Feedrate control unit 134 has an output line 142 connected commonly to the interpolators 52 and 54 to control the rate at which the interpolators produce the output command pulses.

The particular digital to analog servo loops which control mechanisms 14 and 16 are generally conventional as will be apparent to those of ordinary skill in the art. The X axis servo loop comprises a command counter 146 which receives pulses from the interpolator 52 and produces a square wave output to an exciter amplifier 148. Exciter amplifier 148 is connected through a resolver 150 to a phase detector 152. Phase detector 152 also receives reference counter information from the reference counter unit 46. The output of detector 152 is connected through an amplifier 154 to the X axis servo mechanism 14. The X axis slide or translatable portion of tool 12 is mechanically connected back to the resolver 150 to complete the feedback loop.

The servo control loop for mechanism 16 is identical to that for mechanism 14 and includes a command counter 156 connected to the output of the interpolator 54, an exciter 158, a resolver 160, a phase detector 162 which is also connected to the reference counter 146, and an amplifier 164 which is connected directly to the Z axis servo mechanism 16. The portion of th tool or tool bed 12 which is controlled by the Z axis servo mechanism 16 is connected back to the resolver 160 to complete the analog feedback control loop.

FIGURE 2

Figure 2:
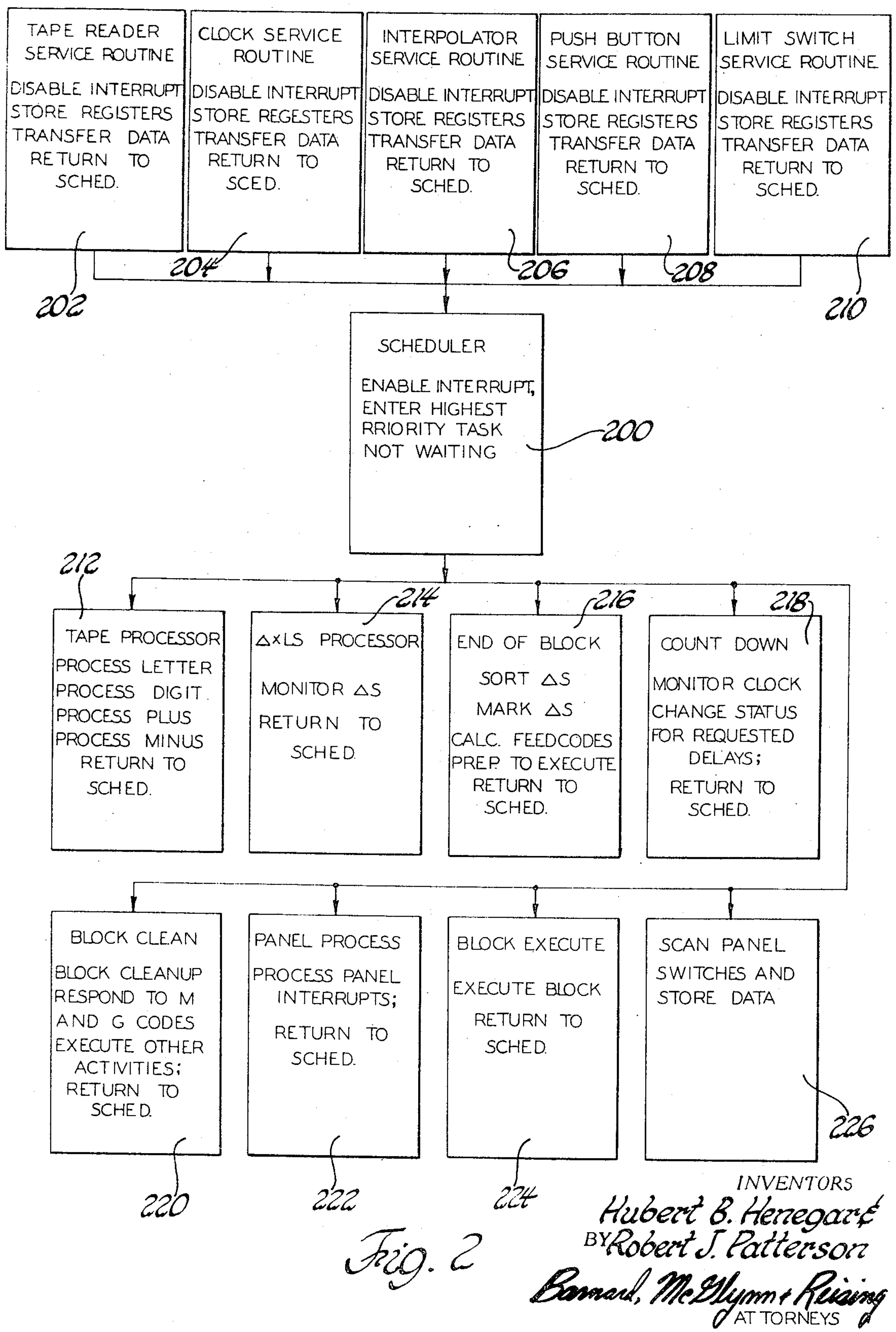
FIG. 2 is a function sequence and priority schedule for the control program.

Referring now to FIG. 2, the overall control scheme of the control program in processor 18 is indicated in block diagram. The control program affords a program control scheduler 200 which when being executed involves the transfer of a signal to the bistable flip-flop device 98 by way of line 100 to enable the interrupt transfer gate 96 in the interrupt line 24 of FIG. 1. The overall operation of the scheduler 200 is to enter the subroutine which corresponds to the highest priority task unless another task or subroutine is only partially executed. Disposed along the top of FIG. 2 are a plurality of interrupt service subroutine blocks 202, 204, 206, 208, and 210 which correspond with the interrupt service subroutines for the tape reader 30, clock 40, interpolators 52 and 54, push button set 66 and limit switch set 88, respectively. Each of the subroutines involve the steps of disabling the interrupt transfer gate 96 by suitable control of flip-flop 98, the acceptance of information and the transfer of such information to other devices, and the return to the scheduler of block 200. None of the interrupt service subroutines are interruptible in themselves due to control of gate 96.

Also shown in FIG. 2 are a plurality of interruptible program subroutines 212, 214, 216, 218, 220, 222, 224, and 226 which are not associated with data source devices. As indicated in FIG. 2, the lowest priority subroutine involves the scanning of control panel switches 80 of the position-maintaining type. Since this is the lowest order function which is executed by the processor 18, it would be possible for the operation of processor 18 to idle in the subroutine of block 226. For example, during the execution of a long machining operation at a low feedrate except that a clock interrupt occurs every 4 milliseconds.

The actual details of the control program are more fully swt forth hereinafter with reference to FIG. 5 so as to permit the proper programming of any digital processor of sufficient computing ability for use in system 10. The foregoing description will suffice to impart a general knowledge of operation of the system 10 to understand the relation between the processor 18 and the other elements of FIG. 1.

FIG. 3

Figure 3:
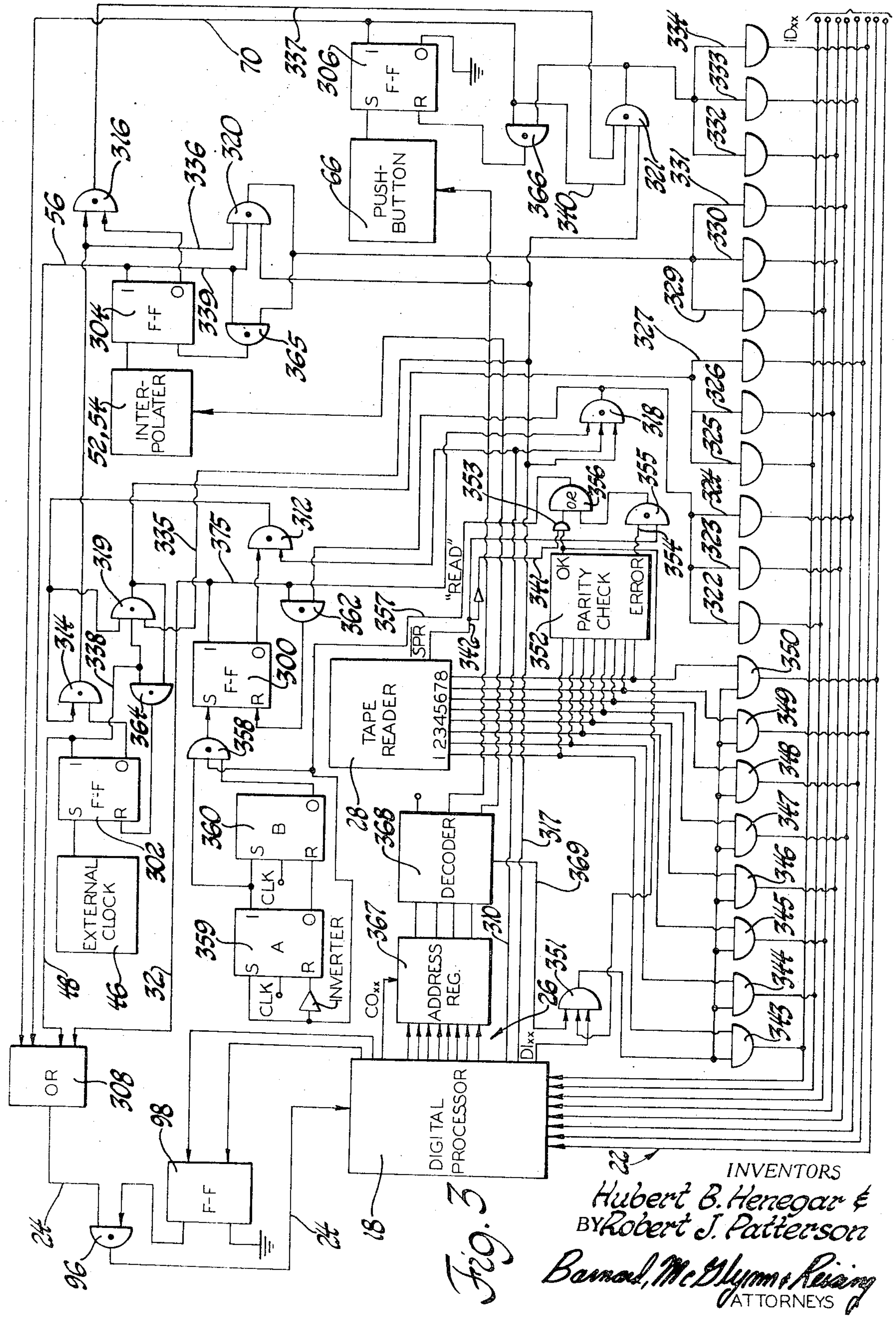
FIG. 3 is a circuit diagram of the interrupt control systems, and FIGS. *3a* and *3b* are timing diagrams.

Referring now to FIG. 3, there is shown the circuit arrangement which is external to the processor 18 for providing the interrupt signals from the interrupting devices 28, 46, 52, 54, and 66 to the processor 18 and for establishing the priority with which such interrupt signals are received and, thus, the priorty with which the interrupt service subroutines are entered. Timing diagrams helpful in describing the operation of the circuit of FIG. 3 are shown in the auxiliary FIGS. 3a and 3b.

In FIG. 3, the input bus 22 of digital processor 18 is shown to comprise eight lines which are adapted to receive both address and data information from the source devices 28, 46, 52, 54, and 66. Such information generally includes eight bits which flow in parallel. To control the flow of both address and data bits from the interrupting devices to the processor 18 in accordance with a predetermined order or priority, each of the interrupting devices 28, 46, 52, 54 and 66 has associated therewith an interrupt flip-flop 300, 302, 304, and 306, respectively. These flip-flops are bistable devices having both set and reset conditions between which a high-voltage output is toggled between the two output lines identified in FIG. 3 by the numbers 1 and 0. A data flow condition in any of the interrupting devices causes the associated interrupt flip-flop to toggle from the reset to set condition and to remain in this condition until the addess of the interrupting device is transferred to processor 18. The "one" outputs of the interrupt flip-flops 300, 302, 304, and 306 are connected by way of lines 32, 48, 56, and 70 to separate inputs of an OR gate 308. OR gate 308 is of the type which produces an output on interrupt line 24 when one or more of the inputs is high. Interrupt line 24 is connected to the processor 18 by way of the flip-flop controlled AND gate 96 which operates under the control of interrupt enabling and disabling flip-flop 98 as previously described with reference to FIG. 1. Accordingly, any one or more of the interrupting devices is capable of transferring an interrupt signal to the processor 18 by way of the OR gate 308 and the interrupt line 24. The schematic circuit of FIG. 3 reinforces the previous statement to the effect that the interrupt line 24 need by only a single conductor.

An output line 310 from processor 18 carries a priority signal which is alway high and which propagates through the series connected AND gates 312, 314, and 316 as far as is permitted by the actual identity of the interrupting device. To this end it will be noted that the "zero" output of interrupt flip-flops 300, 302, and 304 are connected to one input of each of the AND gates 312, 314, and 316, respectively, and the interrogation signal line 310 is connected through the gates 312, 314, and 316, in sequence. Accordingly, if the source of the interrupt signal is interrupt flip-flop 300, the priority interrogation signal cannot pass through gate 312 since the ZERO output of device 300 is low. On the other-hand, if flip-flop 302 is the source of the interrupt signal, the ZERO output of flip-flop 300 is high and the priority signal propagates through gate 312 to gate 314. In a similar fashion if interrupt flip-flop 304 is the source of the interrupt signal, the priority signal is permitted to propagate through gates 312 and 314. Finally, if interrupt flip-flop 306 is the source of the interrupt signal, all of the ZERO outputs of interrupt flip-flops 300, 302, and 304 remain high and, thus, the priority signal propagates through all of the gates 312, 314, and 316.

Upon receipt of the interrupt signal and at the end of the instruction currently being executed, the processor 18 produces an input-output "acknowledge" signal on line 317. The input-output acknowledge signal is presented simultaneously to one input of each of the AND gates 318, 319, 320, and 321. The AND gates 318, 319, 320, and 321 are operatively associated with the data source devices 28, 46, 52, 54, and 66, respectively, as will be made more clear in the following description of additional circuitry. Energization of gate 318, for example, occurs on simultaneous receipt of inputs from priority line 310, the input-output acknowledgement line 317, and a setting of interrupt flip-flop 300 to the ONE condition to energize line 375. If all three inputs to gate 318 are received, the address of the tape reader 28 is communicated to the digital processor 18 by way of the input bus 22.

More specifically, the output of gate 318 is connected through wired OR gate lines 322, 323, and 324 to selected input bus lines such that the address of the tape reader 28 is read by processor 18 in digital form as 01011000 wherein each "zero" represents an input line in the bus 22 reading from top to bottom in FIG. 3 which is not connected to the output of gate 318 via wired OR gate circuit and each "one" represents an input bus line which is connected to the output of gate 318 via wired OR circuit. In a similar fashion, energization of gate 319 is effective to transfer to processor 18 the address of the real time clock or reference counter 46. Note that a wired OR is necessary only on input bus lines when a 1 appears in the device address; i.e., address 00100000 requires only one wired OR gate; address 01101100 requires four gates, etc. The circuit of FIG. 3 is illustrated with three gates in each case, but this is not to be taken as limiting. The output of gate 319 is connected through wired OR gate lines 325, 326, and 328 to the first, third, and sixth input bus lines such that the address of clock 46 is read as 10100100. Similarly energization of gate 320 is effective to read the address of interpolators 52 and 54 into the processor 18 by way of address line 329, 330, and 331 which are connected to the second, third, and fourth input bus lines. Therefore, the address of the interpolators 52, 54 is established as 01110000. Finally, energization of gate 321 causes energization of wired OR gate address lines 332, 333, and 334 to the third, fifth, and sixth input bus lines. Therefore, the address of push button 66 is 00101100.

All of the addresses given above are permanently established by external wiring between the gates 318, 319, 320, and 331 and the input bus 22 and the address information is properly placed in memory 20 to identify each device address with an interrupt service subroutine in FIG. 2.

It can be seen from the diagram of FIG. 3 that the gates 318, 319, 320 and 321 can only be energized to transfer address information in accordance with the interrupt priority which is established by gates 312, 314, and 316. More specifically, should the tape reader 28 be the source of the interrupt signal, the interrupt flip-flop 300 associated with the tape reader 28 is toggled to the ONE condition, thus, disabling gate 312. Disabling gate 312 prevents the priority signal on line 310 from propagating to any of the following gates. The output of gate 312 is connected by line 335 to the input of gate 319 and, thus, gate 319 cannot operate to transfer an address in the absence of a signal from gate 312. Similarly, the output of gate 314 connected by way of line 336 to the input of gate 320 and, therefore, gate 320 cannot become conductive to transfer an address in the absence of a signal from gate 314. Finally, the output of gate 316 is connected directly to an input of gate 321 by way of line 337 such that gate 321 cannot be rendered conductive to transfer the address of push buttons 66 to processor 18 unless gate 316 remains conductive. It will be noted that the third input to gates 319, 320, and 321 is obtained by way of lines 338, 339, and 340 from the ONE output of the interrupt flip-flops 302, 304, and 306, respectively.

From the foregoing it can be seen that the selection of any data source device for transfer of its address as the interrupting device to the processor 18 is conditional upon the absence of an interrupt signal from any of the previous data source devices in the priority string line 310. Should any such previous data source device in the wiring arrangement of FIG. 3 have produced an interrupt signal, thus, toggling its associated interrupt flip-flop, the priority signal on priority line 310 will propagate only as far as the last AND gate 312, 314, or 316 which is conductive. Moreover, the acknowledge signal on line 317 operates only an address transfer gate 318, 319, 320, or 321 associated with the interrupting device.

Figures 3A, 3B, 4, 4A:
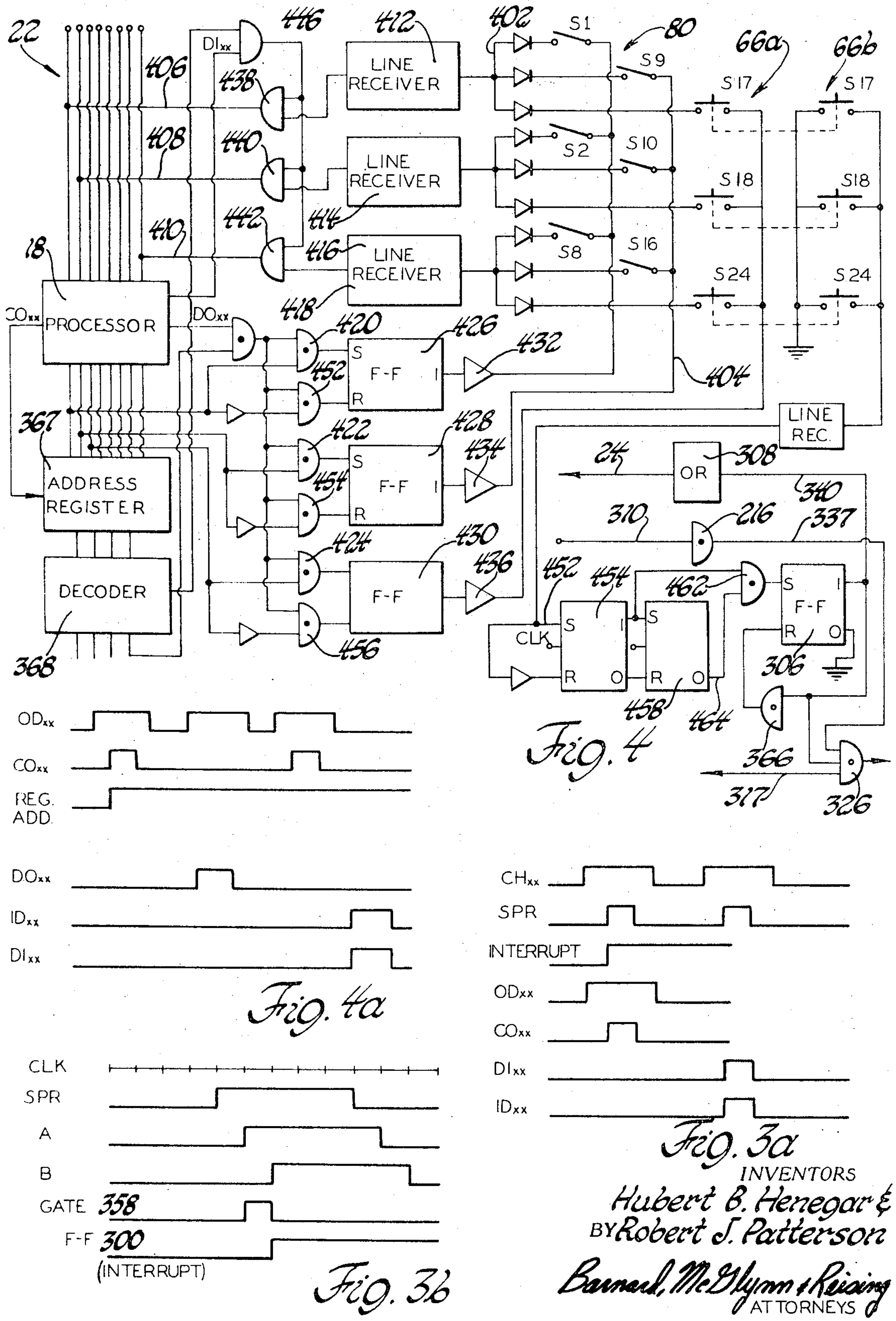
FIG. 4 is a circuit diagram of a switch scanning and interrupt control system, and FIG. *4a* is a timing diagram.

Tape reader 28 has been selected in FIG. 3 and FIG. 3*a* to illustrate the case of a data source device which, after having communicated its particular address to the processor 18, is next called upon to transfer data to the processor 18. Tape reader 28 is typical of such devices as are already known in the art insofar as it is provided with eight tape reading channels having separate amplifiers and output lines labeled 1 through 8 in the diagram of FIG. 3. In addition, tape reader 28 is adapted to provide sprocket and "not sprocket" signals on lines 341 and 342, respectively, in accordance with whether or not the sprocket hole is properly in position within the tape reader 28. The sprocket hole is not for drive purposes, but rather for position determination in the reading of characters. For the purposes of FIG. 3, it will be assumed that tape reader 28 is an electrooptical device in which light is shown through the punched holes in each of the eight, parallel tape channels and that the presence of a hole activates a photocell or similar device to produce a signal on the associated output channel. This apparatus is, of course, conventional and is well known to those of ordinary skill in the numerical control art. Therefore, it will not be described in detail. The output channel lines 1 through 8 of tape reader 28 are connected to the input bus lines 22 through AND gates 343, 344, 345, 346, 347, 348, 349, and 350, respectively. These AND gates 343 to 350 are rendered conductive to transfer data from the data channels of tape reader 28 to the input bus 22 only when input part program data characters are available and a gate 351 is rendered conductive by processor-produced signals as will be described.

The output channel lines 1 through 8 of tape reader 28 are also connected to a parity check unit 352 having an output line 353 which is energized if an odd number of input signals is received and an output line 354 which is energized if an even number of input signals is received. This odd, even parity check is also well known to those of ordinary skill in the art and is employed to sense the presence of part program errors or tape reading errors in the tape 30. In the present example, an error is presumed to exist if there is an even number of holes punched in any character line on tape 30; however, it is to be understood that the opposite convention may also be selected if desired. The error output line 354 is connected through an AND gate 355 along with the not sprocket signal on line 342. The output of gate 355 is connected to an inclusive OR gate 356 along with the "okay" signal from parity check unit 352. The output of inclusive OR gate 356, the "read" signal, is connected by way of line 357 to the reset input of flip-flop 359. The two inputs to AND gate 358 are received from the combination of flip-flops 359 and 360, also labeled A and B, respectively, which are employed to provide the interrupt signal from the tape reader 28 at such time as all eight signal channels are in condition to be read.

Each of the flip-flops 359 and 360 is a bistable device having set and reset conditions for toggling a high-voltage signal between ONE and ZERO outputs, as indicated. The set input of flip-flop 359 is connected to receive the read signal on line 341 whereas the reset input is connected to receive the inverse of the sprocket for resetting purposes. A clock signal is also applied to each of the flip-flops 359 and 360 to synchronize the changing of states. Such clocked flip-flops are well known. The ONE output of flip-flop 359 is connected commonly to the set input of flip-flop 360 and an input of AND gate 358. The ZERO output of flip-flop 359 is connected to the reset input of flip-flop 360. Finally, the ZERO output of flip-flop 304 is connected to the third input of gate 358.

Accordingly, when all eight channels of the tape reader 28 produce a part program data signal which is of the proper parity the lines 353 and 357 are energized. At the same time a read signal on line 357 sets flip-flops 359 and 360 during successive clock signals to produce inputs to gate 358 during the period between which flip-flop 359 is set and flip-flop 360 is set. This is best shown in FIG. 3B. During this interval, gate 358 is conductive to set interrupt flip-flop 300. This in turn advises the processor 18 that the tape reader 28 is prepared to transfer a part program character to the processor 18 by way of the input bus 22 as previously described. Accordingly, the interrupt signal which indicates the data flow condition is caused only when a character is ready to be read.

If a parity error occurs, an interrupt is generated after the sprocket signal has passed and an all-zero character is input to the processor 18, which, being a special character, is interpreted as an error condition and the tape reader 28 is halted.

Following the transfer of address information from any of the input data source devices 28, 46, 52, 54, and 66 to the digital processor 18, it is necessary to reset the interrupt flip-flops which are associated with the interrupting devices. In this manner interrupting devices not having received attention by way of the execution of an interrupt service subroutine because of the previous attention given to a data source device of higher priority can be serviced upon clearing of the interrupt flip-flop of the higher priority device. For the purpose of resetting interrupt flip-flop 300, the ONE output line 375 is connected along with the signal on line 361 from the output of address read control gate 318 to the inputs of a reset gate 362. Gate 362 is of the AND type and is connected to the reset input of flip-flop 300. Accordingly, upon simultaneous occurrence of a ONE from interrupt flip-flop 300 and an address read signal from gate 318, the flip-flop 300 is reset.

Similarly interrupt flip-flop 302 is provided with a reset gate 364 which receives inputs from the ONE output of the flip-flop as well as from the address read control gate 319. Interrupt flip-flop 304 is provided with reset gate 365 which is provided with signals from the ONE outputs of flip-flop 304 and the address read control gate 320. Finally, interrupt flip-flop 306 is provided with a reset gate 366 which is provided with inputs from the ONE output of flip-flop 306 and the output of the address read control gate 321. The net result is that each interrupt flip-flop is reset only as a result of the acknowledge signal on line 317 and the consequent transfer of address information from the interrupting device.

The transfer of data from any input device in the arrangement of FIG. 1 to the processor 18 is controlled by the processor 18 through a technique which involves outputting the address of the device in a manner to that previously described with reference to the tape reader 28. Accordingly, referring again to FIG. 3 the processor 18 is provided with an eight address line bus 26 in which the lines are connected in parallel to an address register 367. Register 367 has four output lines connected to a decoder 368 having output lines connected to each of the data input devices. Decoder 368 has an output line 369 which is connected to an input of AND gate 351, for example, to provide a pulse which permits reading of the part program data from the tape reader channels to the input bus lines as shown in FIG. 3. Similarly, other output lines are connected to other input devices including the push buttons 66, and the position counters 106 and 108 of FIG. 1.

The operation of the embodiment illustrated in the wiring diagram of FIG. 3 is believed to be apparent from the foregoing description. A brief additional description will be given to illustrate preferred timing by reference to the timing diagrams of FIGS. 3*a* and 3*b*.

Assuming the function to be described involves the transfer of part program data from the tape reader 28 to the processor 18, the occurrence of the sprocket signals SPR along with the latter occurrence of the signals from flip-flops 359 and 360 is indicated by the second, third, and fourth lines in FIG. 3*b*. The fourth line of FIG. 3b indicates the duration of the output pulse from gate 358 which sets interrupt flip-flop 300 to produce the interrupt signal by way of line 32 and OR gate 308 to the interrupt line 24. The bottom line of FIG. 3*b* indicates the occurrence of the ONE output from interrupt flip-flop 300. It can be seen by reference to the uppermost or clock signal line in FIG. 3b that all of the signals occur in a sequence.

Once the interrupt signal has occurred, the input/output acknowledge lines 310 and 317 are energized in order to enable gate 318 to transfer the address of tape reader 28 to the input bus 22 by way of lines 322, 323, and 324. In addition, the occurrence of the address transfer signal is communicated by way of line 361 to the reset gate 362 to reset the flip-flop 300 to the ZERO condition. This enables AND gate 312, thus, to pass the interrupt service availability to the lower priority devices as previously described. Referring to FIG. 3*a*, the character to be read into processor 18 by tape reader 28 appears on tape reader output channels 1 through 8. A channel containing a ONE is shown on the top line of FIG. 3*a*. The sprocket (SPR) signal on line 341 occurs in the center of the character bit and must correspond with a parity OK signal to cause line 353 to go high, thus to produce the read signal on line 357 which is input to flip-flop 359 to begin the interrupt signal sequence defined in FIG. 3*b*.

The last four lines of FIG. 3*a* are shown on a greatly expanded time scale relative to the first three lines for the sake of clarity. For example, the period of the tape channel (data) pulse on the top line may be 3.33 milliseconds whereas the pulse sequence time of the last four lines may be only 8 or 10 microseconds. The absolute numbers are not so significant as the relative ratio.

The $OD_{xx}$ signal signifies the need to output data from the tape reader and contains the tape reader address. The $CO_{xx}$ signal is the "strobe" signal produced by the processor within the $OD_{xx}$ pulse time and causes the actual transfer of the device (tape reader) address to the address register 367. Later, the $DI_{xx}$ signal is applied to gate 351 to input data from the tape reader 28 to the processor 18. The $ID_{xx}$ signal is simply the data appearing on one line of input bus 22, the line being chosen to illustrate the input of a ONE bit. This time sequence is typical.

With final reference to FIG. 3, it is to be noted that the priority-determining logic shown therein to be external to processor 18 may be implemented by software, the equivalent function of identifying devices ready to transfer data being accomplished by a routine rather than external circuitry.

FIGURE 4

Referring now to FIG. 4, the apparatus for transferring data from position-maintaining switches 80 to the processor 18 and from the push-button switches 66 to processor 18 is shown in greater detail. As was previously described, the input bus 22 of the processor 18 comprises eight individual lines capable of providing parallel transfer of eight data bits. It is assumed for purposes of illustration that there are at least sixteen switches 80. Accordingly, position maintaining switches 80 are organized into groups 402 and 404, each comprising eight switches. The switches of group 402 are labeled S1 through S8 and switches of group 404 are labeled S9 through S16.

In accordance with the operation of the illustrative embodiment, the switches of groups 402 and 404 are scanned and the contents thereof read into the processor 18 in a non-interrupt mode; that is, the control program of the processor 18 is such that the condition of switches in groups 402 and 404 is read only when there is no data transfer task of higher priority to be attended to. Therefore, it is to be understood that switches 402 and 404 are not provided with an interrupt capability and are not "interrupting devices" as that term is used in this text. As will be subsequently pointed out, the switches of group 66, labeled S17 through S24 do operate in an interrupt mode and, thus, are provided with the capability of interrupting any lower priority of the processor 18 in accordance with apparatus to be described. All switches, however, are input devices for the transfer of data to the processor 18.

The eight switches of each of the groups 402 and 404 as well as the eight push-button switches 66 are connected to the input bus lines by way of eight connector lines 406, 408, and 410, it being understood that only three switches per group and three lines are shown for the sake of simplification. Reliability considerations suggest that voltages higher than those normally employed to input data processors be used at the switch itself and for this reason level converter means in the form of line receivers 412, 414, and 416 are connected in circuit between the switches and the individual connector lines 406, 408, and 410, respectively. Line receivers 412, 414, and 416 also employ RC filter networks to eliminate the effects of "switch bounce" and high frequency noise which might alter the operation of the processor 18 if permitted to be applied to the input bus lines 22. Such RC filter circuits are known in the art and, thus, are not described in detail with respect to FIG. 4.

The switches in groups 402 and 404 may be taken as representative of position-maintaining, thumbwheel switches and dials found on the control panel of the console illustrated in FIG. 6. In addition, they may be representative of non-interrupting limit switches and any other external hard contact device which is employed to input information in digital form to the processor 18. The switches are inherently digital devices, the closure of such switches being effective to provide a digital ONE and the open condition of such switches being representative of a digital ZERO.

The waveforms of FIG. 4a are useful in illustrating the timing sequence for a data transfer from switches 66. The output data or $OD_{xx}$, signal contains the address of the switch group to be services. In FIG. 4, the address selects one of flip-flops 426, 428, and 430 for toggling. Within the $OD_{xx}$ pulse time, the $CO_{xx}$ signal appears to strobe the device address of $OD_{xx}$ out of the address register 367. The "Reg. Add." signal signifies that the decoder 368 produces an output to one input of gate 418. The $DO_{xx}$ signal is the data output and occurs during a so-called "switch command word" indicated by the second (middle) pulse of the $OD_{xx}$ line. This completes the inputs to gate 418 and causes the selected flip-flop to change state. The input sequence agains includes the inputting device address $ID_{xx}$ to enable gate 446 and the $DI_{xx}$ pulse to complete the inputs to gate 446 and transfer the bits from the line receivers 412, 414, and 416 to the input bus 22.

The transfer of data from switches 80 and push buttons 66 to the processor 18 is controlled by an AND gate 418 which receives an address from the device address decoder and a $DO_{xx}$ or "data output " signal from the processor 18 to apply an enabling signal to each of a plurality of AND gates 420, 422, and 424, each of the AND gates being associated with a separate switch group. The other input to the gates 420, 422, and 424 is received from the first three lines in the output bus 26, as shown. When conductive, the gates 420, 422, and 424 toggle flip-flops 426, 428, and 430, respectively. The toggling of these flip-flops activate switch drivers 432, 434, and 436 in switch driver unit 76 to apply relatively uniform negative potentials to one terminal of each of the switches in the groups 402, 404, and 66, respectively. Assuming switch driver 432 is activated, for example, the negative potential is applied to one terminal or contact of each of the switches S1 through S8 in group 402. Those switches which are open do not send signals to their associated line receiver and the absence of such a signal is interpreted as a ZERO. Those switches which are closed send signals to their associated line receivers these signals being interpreted as digital ONES. In this fashion, an eight-bit word is read into the processor 18 in parallel wherein each bit represents the data content of an individual switch.

In accordance with the overall timing scheme of the illustrated embodiment, the ONES and ZEROS from the line receivers 412 through 416 are introduced into the lines of the input bus 22 by a gating function carried out by AND gates 438, 440, and 442. It is to be again understood that there are eight such AND gates, one for each bit or input line. The condition of gates 438 through 442 is controlled by gate 446 which receives device address and $DI_{xx}$ (data on input bus 22) signals from the address decoder 318 and the processor 18, respectively. Gate 446 is the equivalent in FIG. 4 of gate 351 in FIG. 3. When both signals are applied to gate 446, the gates 438, 440, and 442 are enabled to transfer the signals from the line receivers 412, 414, and 416, respectively to the lines of the input bus 22. Of course, the only gates to actually conduct are those associated with a closed switch.

Assuming processor 18 has completed all higher priority tasks and has entered the subroutine for scanning switches 80, an output command and a $DO_{xx}$ signal are applied to the inputs of gate 418. The subroutine next causes a ONE to appear on the lefthandmost line in output bus 26, thus, to cause gate 420 to become conductive setting flip-flop 426. This activates switch driver 432 to apply potential to the switches in group 402. Subsequently a device address and a $DI_{xx}$ signal are applied to gate 446 to enable input AND gates 438, 440, and 442. Those gates which also receive a ONE signal from the associated line receivers 412, 414, and 416 apply ONES to the corresponding lines in the input bus 22. Those gates which receive no signal from the associated line receivers apply ZEROS to the lines of the input bus 22.

Subsequently, the subroutine causes a ONE to appear on the second from the left line in the output bus 26, thus, to enable an AND gate 422 to toggle flip-flop 428. This activates switch driver 434 to apply potentials to switches S9 to S16 in the second group 404. These switches are also read onto the lines of the input bus 22 in a corresponding fashion. The subroutine varies the signal from the lines of the output bus 26 as many times as there are switch groups to be scanned until all such switch groups have been scanned. As previously indicated, the computer may idle in this subroutine for some time, continuously scanning the switches of the individual groups.

The gates 452, 454, and 456 are employed to reset the flip-flops 426, 228, and 430, respectively, at the termination of the individual group identification bit pulses which are applied to the toggling AND gates 420, 422, and 424, respectively. Inverters are connected between the group identifying bit lines and the inputs of the reset gates to cause the reset operation to occur automatically.

Referring now to the push-button switches 66, it was previously mentioned that these switches are provided with an interrupt capability which is to say that closing any switch in push-button switch group 66 is effective to generate an interrupt signal which is applied to the processor 18 by way of interrupt lines 24. It is to be understood that while switches 66 are referred to herein as push-button switches, they may also be taken as representative of limit switches and other hard-contact devices which are to advise processor 18 of a data flow condition (either a transition from open to close or a transition from closed to open) immediately upon the occurrence of the data flow condition. Accordingly, the switches 66 are a "data source device" within the meaning of the text and as specifically illustrated in the circuit diagram of FIG. 3. It will also be made apparent hereinafter that the entire group of push button switches 66 is treated by the processor 18 as an individual device, the data content of all switches being read simultaneously and in parallel by way of the input bus 22.

It is first to be noted that the push-button switches 66 are divided into two distinct contact groups **66*a* and 66*b* of which the contacts of group 66*a* operate to transfer data to the processor 18 and the contacts of group 66*b* generate the interrupt signal and transfer the device address information to the processor 18** following the generation of the interrupt signal. Switch contact portions are mechanically interconnected as indicated such that both contact portions of switch S17, for example, close and open together. This is true for all other switches S18 through S24 as well.

The switch data transfer is carried out under the control of gates 424 and 456, flip-flop 430, and switch driver 436 as previously indicated. Accordingly, the push-button switch portions which are employed for data transfer purposes are treated identically to the position maintaining switches of groups 402 and 404 once the data interrupt signal has been generated and acknowledged and the address of the device represented by switches 66 has been transferred to the processor 18 and understood.

The interrupt generating contacts of push-buttons 66, on the other hand, produce a separate signal-generating function and to this end one contact of each of the switches in the group 66*b* is connected to a reference potential point such as ground while the other contact is connected through line 425 to the "set" input of a first bistable flip-flop 454 via a line receiver circuit. Flip-flop 454 is connected in serial or cascade relationship to flip-flop 458, both flip-flops being subject to external clocking from the processor 18 as indicated. The ONE output from flip-flop 454 is applied commonly to the set input of flip-flop 458 and, by way of line 460, to one input of an AND gate 462. The ZERO output line 464 of flip-flop 458 is connected to the other input of gate 462. The output of gate 462 is connected to the set input of flip-flop 306 which is also shown in the embodiment of FIG. 3. The ONE output of flip-flop 306 is connected through the OR gate 308 to the interrupt line 24 as well as to the reset gate 366 and the address input control gate 321 the operation of which was described with reference to FIG. 3. Flip-flops 454 and 458 perform identically to flip-flops 359 and 360 of FIG. 3 in that they serve to generate a synchronized pulse upon a transition of the data signal.

Describing the operation of the push-button switch group 66 of FIG. 4, the closure of any switch in the group S17 through S24 closes the corresponding contacts in group 66b to apply an input to the set terminal of flip-flop 454 via a line receiver circuit. The flip-flop 454 is set at the next clock pulse. Flip-flop 454 in turn sets the flip-flop 458 and during the interval between the two clock pulses which successively set the flip-flops 454 and 458 both inputs of gate 462 are high. Thus, an output from gate 462 is effective to set the interrupt flip-flop 306. This produces a signal which is applied to the OR gate 308 and thence to the interrupt line 24. Assuming no higher priority data source device stands in need of attention by the processor 18, all of the gates 312, 314 and 316 in FIG. 2 are enabled by their associated flip-flops. Thus, the interrogation signal applied by way of line 310 propagates through gate 216 and is applied to the address input gate 321. The address 00101100 of push-button switch group 66 is applied to the input bus 22 in the fashion described with reference to FIG. 3 upon occurrence of the input-output acknowledge signal on line 317. The receipt of the address which is unique to push-button switch group 66 is received by processor 18 and interpreted as a command to produce an output on the number three digit line in output bus 26 to enable gate 424 to switch flip-flop 430 and activate switch driver 436. This switch driver, as previously mentioned, is unique to the push button switch group 66 and thus, results in the transfer of switch data to the input bus 22 in accordance with the process previously described.

It will be observed that for the purpose of enabling gate 446, the same device address is generated by decoder 368 for the switch group 66 as for the switches 80, the difference in device selection being accomplished by the control program in processor 18 to energize the proper line in output bus 26 to produce the proper switch command word. Alternative decoding and response techniques may, of course, be employed.

FIGURE 5

The various portions of FIG. 5, labeled 5*a* through 5*n*, describe in programming terms the so-called "software" which one adds to the processor 18 of system 10 to cause the general purpose processor to, in effect, become a special-purpose processor specifically adapted to the particular requirements of the arrangement of FIG. 1. In describing the software, the individual subroutines are indicated by means of two or more blocks with appropriate legends identifying in generally functional terms the software features which are to be introduced. It is to be understood that each individual function may require one or more actual machine instructions, these instructions to be prepared according to a format and language which fits the specific hardware selected for the practice of the invention. Such specific commands may be prepared by one of ordinary skill in the programming art having the proper familiarization with the hardware herein described and the overall control requirements which are set forth in this specification.

Figures 5A, 5B, 5C, 5D:
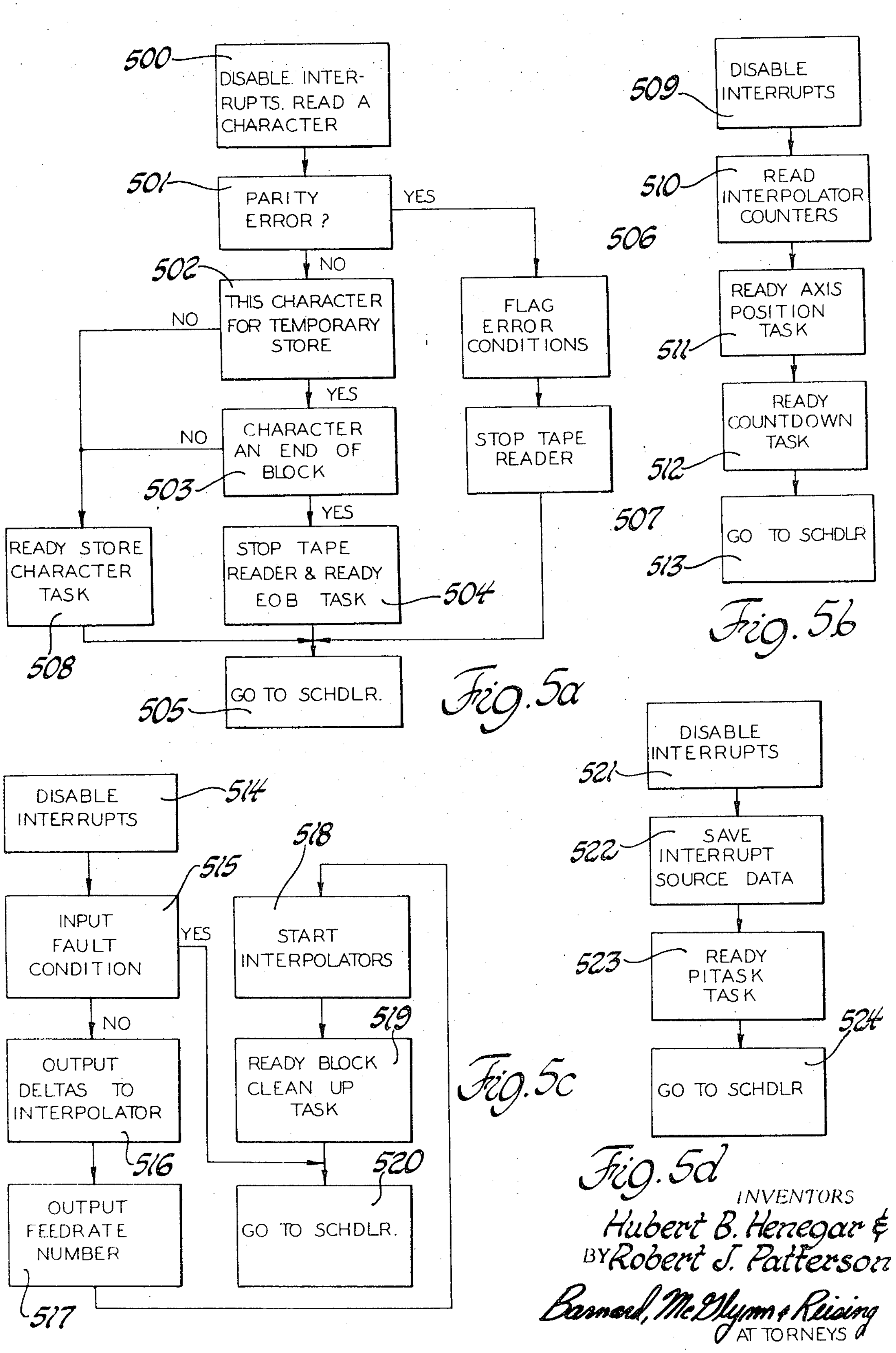

Referring to FIG. 5*a*, the interrupt service subroutine for the tape reader 28 is shown to comprise step 500 which involves the generation of the interrupt disable signal on line 102 of FIG. 1 and the reading of a character from the tape reader 28 in accordance with the operation described with reference to FIG. 3. Step 500 flows to step 501 which is a decision function asking whether or not a parity error has been detected by unit 352. As previously described, a parity error results in all-zero character being input from hardware. If no error is detected and communicated to processor 18, step 501 flows to step 502 which is another decision function to determine whether the character just read is to be placed in temporary storage. This temporary storage is normally carried out for characters midway in a block and involves a buffer storage function so that the entire block of characters may be transferred to the interpolators 52 and 54 in one operation. Assuming the function of step 502 is answered affirmatively, step 502 flows into step 503 which determines whether the character is an "end of block" character. If it is, the operation flows to step 504 which performs the function of stopping the tape reader 28 and preparing to perform an end of block task to be described. Once the end of block task has been readied, the program flows to step 505 which involves a return to the overall schedule routine of FIG. 5*f*. If the step 501 determined the presence of a parity error, the program would automatically flow to step 506 which involves setting a flag to indicate the error condition and, as indicated by step 507, stopping the tape reader 28. In the same fashion, if the character evaluated at step 502 was not for temporary storage, the program would flow from step 502 to step 508 which involves readying the "store character" task to be described with reference to FIG. 5g. The determination that a character is an end of block character also results in the flow of operation from step 503 to step 508. As indicated, step 508 flows to step 505 which produces a retrun to the scheduler of FIG. 5*f*.

Referring to FIG. 5*b*, the interrupt service subroutine for the external clock 40 is indicated to comprise a step 509 which involves disabling the interrupt line 24 by way of flip-flop device 98 in the same fashion that the routine of FIG. 5a operates. Once the interrupt line is disabled, the clock subroutine flows to step 510 which involves reading the contents of the counters 106 and 108 into storage. The routine flows to step 511 and step 512 which cause readying the axis position and countdown tasks of FIGS. 5h and 5j, respectively. The subroutine of FIG. 5*b* ends with step 513 which involves the return to the scheduler subroutine.

Looking to FIG. 5*c*, the interrupt service subroutine for the interpolators 52 and 54 is shown to include the step 514 of disabling interrupts followed by the check to determine whether an input fault condition such as a parity error exists. If no parity error is found, step 515 flows to step 516 which involves transferring by way of output bus 26 the "deltas" or changes in commanded axial positions from the processor 18 to the interpolators 52 and 54 in accordance with part program data. Step 516 flows to step 517 which involves transferring the feedrate number read from the part program tape 30 to the feedrate control unit 134 of FIG. 1. Step 517 flows to step 518 which involves starting the addition process of the interpolators 52 and 54. Step 518 flows to step 519 which involves preparing or readying a "block cleanup" task which involves miscellaneous mathematical and clearing functions. Once this is prepared, the subroutine flows to step 520 which involves returning to the scheduler. If a fault condition in the form of a parity error was indicated at step 515, a direct jump to the scheduler 520 is performed.

Referring to FIG. 5*d*, the subroutine which services the push buttons 66 of FIGS. 1 and 4 is shown to comprise the step 521 of disabling the input line 24. This flows to step 522 which involves the step of transferring to memory 20 the address of the particular switch group which performs the interrupt function. This is to say that the group of eight push button switches 66*a* and 66*b* of FIG. 4 is, in the typical installation, only one of several push-button groups, each group having its own device address which is transferred to the processor 18 by way of the circuitry indicated in FIG. 3. Since each group of push buttons uses the same data input lines on the eight line input bus 22 and the address information from the particular push-button group is dissipated as far as the external hardware is concerned promptly upon acknowledgement, it is necessary for data interpretation purposes to save the interrupting device address by the proper transfer to storage. Step 522 flows to step 523 which involves the readying of the panel interrupt task of FIG. 5*m*. Step 523 flows to step 524 which produces the return to the scheduler routine of FIG. 5*f*.

Figure 5E:
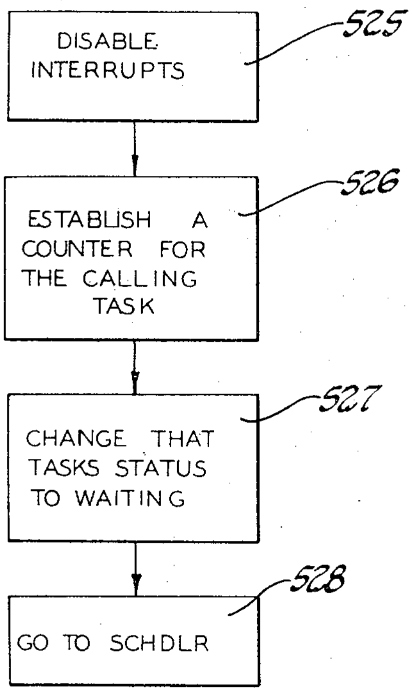

FIG. 5*e* discloses an optional subroutine which can be employed to establish a timing interval following the receipt of an interrupt signal before the interrupt service subroutine peculiar to the interrupting data source device is performed. This subroutine involves step 525 of disabling interrupt line 24, step 526 which involves the establishment of a timing function herein called a counter for the calling task, step 527 which involves changing the status of the task to be delayed to that of a waiting task. Step 527 flows to step 528 which involves a return to the scheduler of FIG. 5f.

Figure 5F:
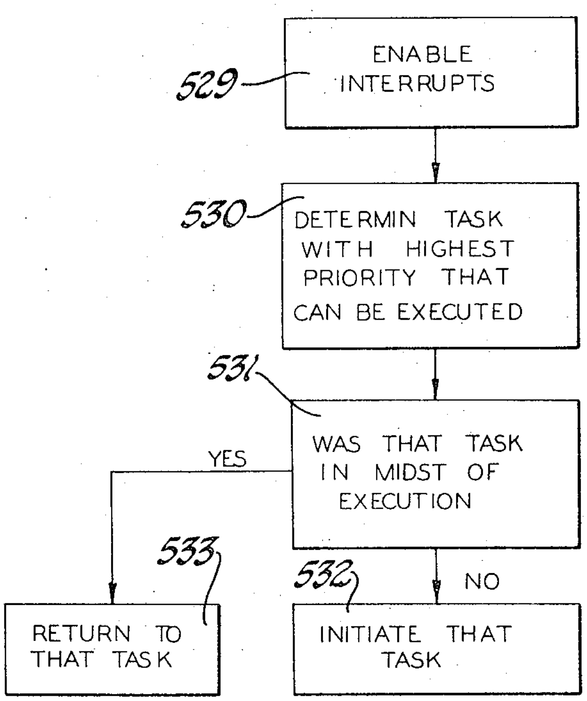

FIG. 5*f* shows the scheduler subroutine to include the step 529 of enabling the interrupt line 524 by production of a suitable output signal on line 100 of FIG. 1. From step 529 the subroutine flows to step 530 which involves the determination of the highest priority task or subroutine which is in condition to be executed. Step 530 flows to step 531 which is a logical decision as to whether the task determined in step 530 is in the midst of execution. It will be recalled that with reference to FIG. 2 the subroutines along the upper row are noninterruptible while the subroutines along the lower row are interruptible and, therefore, if one of the lower tasks is interrupted in the midst of execution, it is desirable to return to that task as soon as no interrupt service subroutine requires execution. If the task selected in step 530 is not in the midst of execution, the program or subroutine flows to step 532 which involves initiating the task selected. Otherwise the subroutine flows to step 533 which involves a return to the interrupted task at the point of interruption.

Figure 5G:
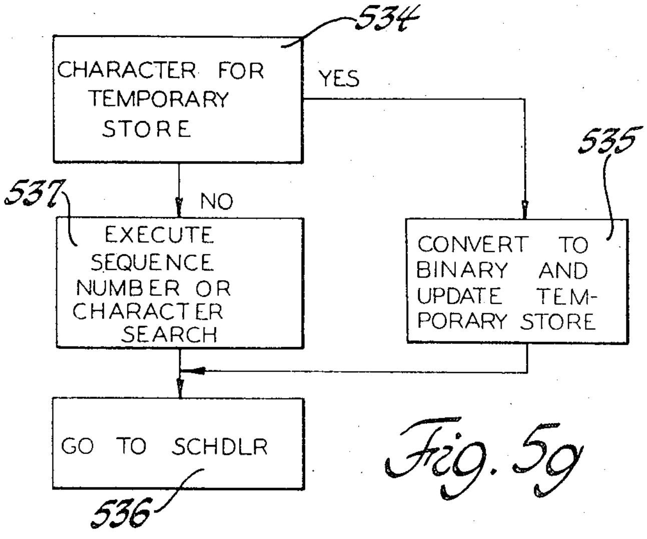

FIG. 5*g* illustrates the steps involved in the store character task which is performed in conjunction with the operation of tape reader 28. The store character task subroutine involves step 534 which is a logical determination of whether a character from the part program tape 30 is for temporary storage or for transfer to the interpolator. If it is for temporary storage, step 534 flows to step 535 which produces the conversion of the character to pure binary and updating the temporary storage facility which may be a buffer storage portion of memory 20. From step 535 the subroutine flows to step 536 which is the return to the scheduler routine. On the other hand, if the character is not destined for temporary storage, the program flows from step 534 to step 537 which involves the execution of a sequence number or character number search in accordance with values or parameters entered manually by way of the apparatus of FIG. 7.

Figure 5I:
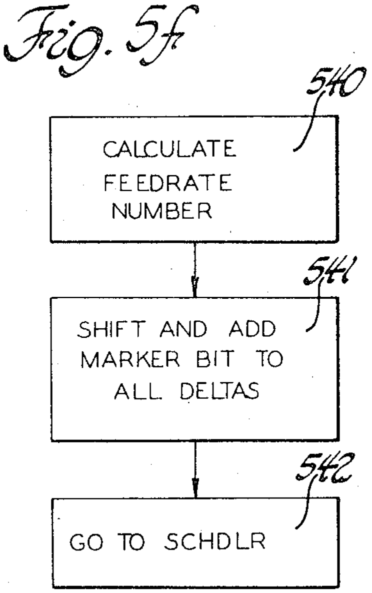
Figure 5H:
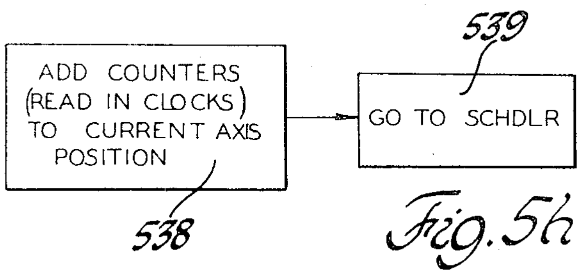

FIG. 5*h* illustrates the steps 538 and 539 of the update axis position subroutine. Step 538 simply involves adding the contents of the position counters 106 and 108 to the total or cumulative commanded axis position in memory 20. Step 539 is a return to the scheduler subroutine.

FIG. 5*i* illustrates the end of block task which is readied by step 504 of FIG. 5*a*. The end of block task includes step 540 of calculating the feedrate number which is commanded by the information on the part program tape 30. The end of block task further includes step 541 which is performed to shift an end of block marker bit to all interpolator deltas to shorten the interpolation time by effectively shortening the register length to correspond to the number therein. The shortening is accomplished by shifting the number by the number of unused interpolator positions in the current block. Step 541 is followed by step 542 which is a return to the scheduler subroutine.

Figure 5J:
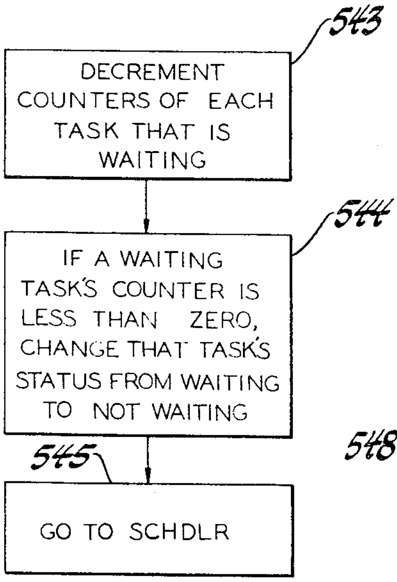

FIG. 5*j* is a flow chart of the countdown task which is established in the event there is to be a timer function performed in accordance with FIG. 5*e*. The countdown task involves step 543 of decrementing the clock times established by the timer subroutine for each task that is waiting. Step 543 flows to step 544 which involves determining that the counter function of a given delayed task has been reduced to a value less than zero, and changing that task's status from waiting to not waiting so that the task can be performed immediately. Step 544 flows to step 545, a return to the scheduler subroutine.

Figure 5K:
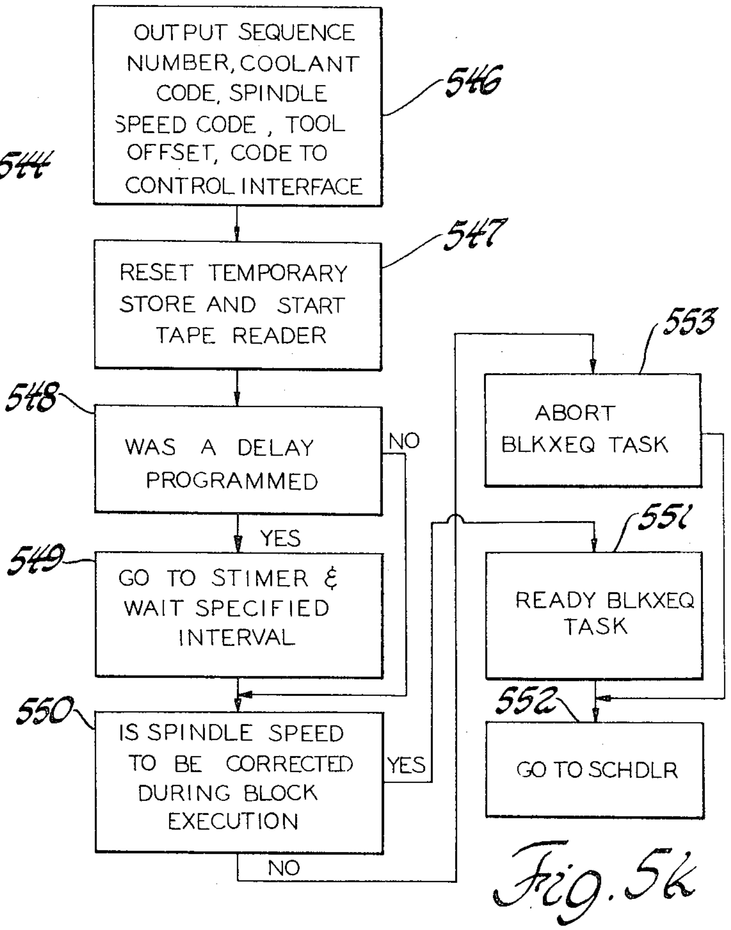

FIG. 5k is the flow chart of the block clean-up task, that task which is performed to execute the requirements of data on the part program tape other than that relating to axis positions and feedrate. This subroutine begins with step 546 which involves outputting by way of bus 26 the sequence number, if any, the coolant code, the spindle speed code, and the tool offset code. These codes are directed by way of the output bus 26 to the proper devices for responding to this information in a fashion which is conventional and will be apparent to those of ordinary skill in the art. Step 546 flows into step 547 which involves resetting the temporary storage for tape reader characters and starting the tape reader 28. Step 547 flows to step 548 which involves the determination of whether a delay was programmed in the block cleanup task. If there is a delay, step 548 flows to step 549 which involves a return to the set timer subroutine and waiting for the specified interval. If there is no delay or if the delay has been concluded in accordance with step 549, the program subroutine flows to step 550 which involves the logical determination or whether a spindle speed correction is to be made during a block execution. If such a correction is to be made, the program subroutine flows to step 551 which involves readying the block execute task and a return to the scheduler by way of step 552. If there is no spindle speed correction during block execution, step 550 flows to step 553 which involves aborting the block execute task and proceeding directly to the scheduler of step 552.

Figure 5L:
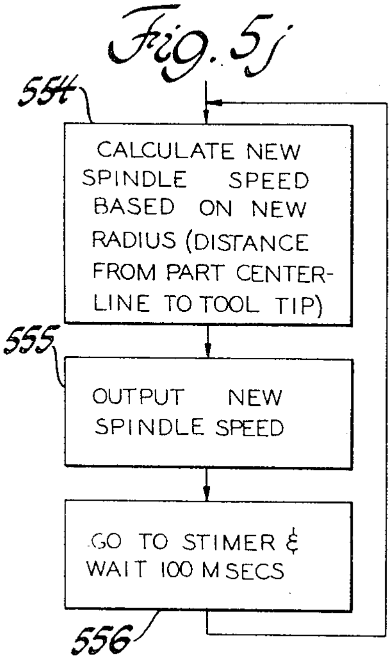
Figure 5N:
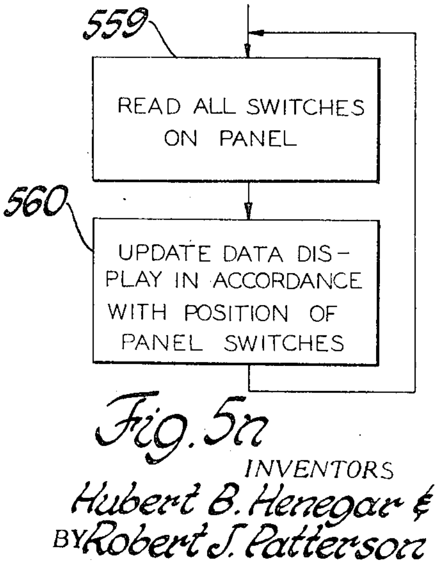
Figure 5M:
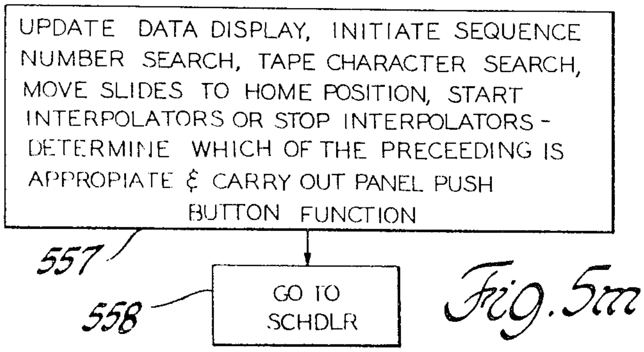

FIG. 5l shows the block execute task subroutine to include step 554 of calculating the new spindle speed based on a new radius of curvature, i.e., the distance from the part centerline to the tool tip. Step 554 flows to step 555 which involves outputting the new spindle speed by way of the output bus 26 to the inches per revolution control unit 152 of FIG. 1. Following step 555, step 556 is performed to advance to the set timer subroutine and wait 100 milliseconds. Step 556 may be performed as a loop function as indicated.

FIG. **5*m* shows the panel interrupt subroutine to involve the generalized step 557 of updating the data display on the panel of FIG. 7, initiating a sequence number search, if any, the tape character search, if any, moving the tool slides to the home position, if required by operation of apparatus of FIG. 7, starting the interpolators or stopping the interpolators, determining which of thepreceding task is appropriate in accordance with the panel interrupt function and carrying out thepanel push-button function required. Step 557 is followed by step 558** which involves return to the scheduler.

FIG. **5*n* shows the lowest priority subroutine which is the scanning of the panel switches which do not have an interrupt capability. This subroutine includes step 559 which is the reading of all switches on the control panel and the transfer of this information to the processor 18 by way of the eight-line input bus 22. This step flows to step 560 which involves udating the data display in accordance with the position of the panel switches. The subroutine of FIG. 5*n*** then is carried out in a loop function subject to an interrupt signal from a higher order subroutine or task.

FIGURE 6

Referring to FIG. 6, a preferred construction and packaging scheme for the numerical control system apparatus described herein is shown to comprise a metal console cabinet 600 having two upright sections 602 and 604. Each section is provided with a vertically hinged front opening door. The cabinet section 602 is provided with an L-shaped Plexiglass panel 606 which reveals the tape carriage portion of tape reader 28 so that mechanical operation thereof can be observed. The tape reader controls are disposed in the upper half of the cabinet section 602 and the system power supply is disposed in the lower half of cabinet section 602. The right-hand cabinet section 604 has on the upper portion thereof a panel 608 more fully described inFIG. 7 for entering data manually. Beneath panel 608 is the front panel 610 of the digital processor 18. Panel 610 contains an assortment of lights and controls for the operation of the processor. Beneath the panel 610 but within section 604 is the logic card rack including the circuitry for interfacing the processor 18 with the external devices.

The control cabinet or console 600 is connected by way of a cable 612 to the machine tool 12 which, in the illustration of FIG. 6, is a two-axis lathe 614 having a turret 616 and a control panel 618. It is to be understood, however, that the apparatus and principals herein disclosed for the numerical control system may be readily expanded to three, four, five, and greater numbers of controlled axes in accordance with the design requirements of the particular machine tool being controlled.

FIGURE 7

Referring now to FIG. 7, the panel 608 from the console cabinet 600 of FIG. 6 as shown in greater detail to comprise an upper display portion 700 which is disposed behind a dark, Plexiglass pane. Control panel 700 comprises a plurality of sectioned and labeled lights including group 702 which indicates the control status of the system, light group 704 which indicates the mode in which the control program is currently operating, light group 706 which indicates the location of a control fault, light group 708 which indicates the adaptive control status, and light group 710 which indicates the adaptive control constraints which have been imposed. Below the light groups 702 through 710 are a plurality of Nixie tube groups including group 712 comprising three tubes which display the sequence number being performed, group 714 having two tubes indicating the tool offset number which has been placed into the apparatus and tube group 716 having eight tubes for displaying the current data from the part program or any other data source which is selected for display.

Panel 608 corresponds generally with panel 68 of FIG. 1 and further comprises a plurality of switches, push buttons, and dials for entering digital information into the control system. These switches include dial 718 which is rotatable between seven positions as shown to select the operating mode of the system. Switch group 720 includes 10 thumbwheel switches 722 having associated digit wheels for entering command address, position display, axis number, and log number information as indicated. The thumbwheel switches 722 may be in the switch group 80 of FIGS. 1 and 4. Push-button group 724 comprises a group of 13 push buttons 66 of which ten are employed to enter numeric information, one is employed to indicate a minus arithmetic function, one is employed for clearing purposes, and one is employed to punch the "enter" command. A clear and set up group is provided including dial 726 and push buttons 728 and 730. The input and display dial 732 is provided to select the particular input and display operations desired. Tape reader controls are provided by way of dials 734 and 736. Push button 738 controls the start of any given cycle. A percent feedrate dial 740 is provided. Next a pair of axis symmetry dials 742 and 744 are provided for the X and Z axes, respectively. A lamp test dial 746 may be provided along side of an adaptive control dial 748. Manual feedrate dials 750, 752, and 754 are provided for entering and controlling manual feedrate information. An optional stop dial 756 and an emergency tool slide stop push button 758 complete the control devices on the panel of FIG. 7.

It was previously indicated with reference to FIG. 4 that the push buttons and switches of panel 608 are arranged in groups of eight to correspond with the eight input lines of bus 22. Each group of eight is treated by the processor 18 as a device. Moreover, some such switches have an interrupt capability and some do not.

Among those switches which have the interrupt capability are push buttons 66, the manual feedrate switch 754, the axis zero push button 728, the auto home push button 730, the cycle start push button 738, the slide stop push button 758, the switch 726, and the tape reader reel control switch 734. The push buttons are, of course, spring loaded to open upon release of manual pressure. The switches are also spring loaded to rotate back to a reference or open circuit position as well.

Push buttons labelled zero through seven of set 66 constitute one device group having its own unique interrupt address. Push buttons labelled eight, nine, minus, and enter, along with switches 754 (two positions), 728, and 730, constitute another device group again having a unique interrupt address. The remaining switches constitute the third device group having its own address. Each device group is provided with an address input circuit like that shown for push buttons 66 in FIG. 4. Whenever any switch in the device group is pressed, the entire group of eight is input, but only that line associated with the closed switch receives a ONE.

Since the switch device group causing the interrupt presents its address to processor 18 only until acknowledged, the subroutine of FIG. **5*d*, step 522** is required to save (store) the address of the interrupting switch group. Thus, the data entered via the particular input bus line is interpreted in the light of the device address so saved to distinguish it from the same data which might come from other switch groups.

One of the functions performed by the switches 66 and 80 is the entering of tool offset information into the memory 20 of processor 18. This is to be distinguished from conventional systems in which tool offsets are stored in the form of thumbwheel switch setting which must remain in the set position as long as the particular offset is to be in effect. In accordance with the illustrative embodiment, tool offsets are stored in memory 20 and are manually loaded into the memory in an addressable location such that the tool offset number may be employed to address that location and call the tool offset associated with that location into effect. In an illustrative system, approximately 100 different tool offsets may be stored in the memory 20. Once the concept of tool offset storage is established, additional offsets require only additional memory space.

To load a tool offset into memory 20 the input and display switch 732 is set to the tool offset position and the mode switch 718 is set to data input. Each tool offset, which consists of one or more incremental axis commands, is identified by one of the tool offset numbers from 1 to 99 in the previous example. This number is entered into the thumbwheel switches 722 and the incremental commands are entered using the push buttons 66 of keyboard 724.

A two-digit Nixie tube display 714 provides the machine operator with a visual indication of the tool offset that is currently active during the execution of a part program. Tool offsets may be called into play by the part program on tape 30 in a variety of ways and the offset motions may be executed simultaneously, sequentially, or may be combined with tape-commanded motions if desired.

In the case of a lathe the part program read by tape reader 28 from tape 30 presents feedrate information to the processor 18 and the processor uses this information to prepare signals for transfer to the feedrate control unit 134. The feedrate control unit 134 in turn generates add commands which are applied to the interpolators 52 and 54 to determine the rate at which tape block information is executed by the tool 12. The use of the processor 18 having a memory 20 and being programmable by conventional software techniques permits a single hardware system to accommodate a variety of feedrate input formats. The hardware in the feedrate system is conventional and is generally external to the computer or processor 18 for providing the add command pulse rate to the conventional DDA interpolators 52 and 54 using a binary number input plus clock.

The output pulse rate from the interpolators 52 and 54 is proportional to the feedrate number supplied to the feedrate control unit 134 by the processor 18. This number is calculated by a subroutine using the feedrate command word on the tape 30. The format of this word might be FRN (feedrate number) inverse time, direct IPM, or some other format and a different subroutine is required for each.

In the case of a direct IPM feedrate format, processor 18 calculates the feedrate number for the feedrate control unit 134 using the programmed equation:

$$FRN = 2^{17}/3\times10^{4} \times IPM/\Delta R$$

where Δ R is the normallized vector motion in the block.

Another feature of the subject invention is the "auto home" feature which involves the use of push button 730 in the panel 608 of FIG. 7. It is conventional for machine control units to have an auto home feature for positioning the machine slides at some predefined point such as a tool change position. This point is defined by the machne tool builder in conventional systems and modification of the predefined position can only be accomplished by way of difficult and expensive hardware modifications.

In the system 10 the auto home position is accomplished by depressing push button 730 to interrupt the control program and begin the motion of the tool slides simultaneously or sequentially and continuing that motion by outputting deltas to the interpolators along with an appropriate FR number until a signal from a tool limit switch having an interrupt capability is received. At this point the processor 18 determines the address, that is, the actual identity, of the interrupting limit switch and when that limit switch is determined to be the switch associated with the auto home position, the motion of the tool slides is discontinued. An extremely simple subroutine can accomplish these features as will be readily apparent to those of ordinary skill in the art. If necessary, the program can compute the actual motion of the tool slides along the control axes which are required to obtain a specific position in response to the auto home signal. This is also readily accomplished since the position of the machine slides is maintained in storage at all times by way of the continuous transfer of information from the position counters 106 and 108 to the memory 20.

The software associated with the processor 18 preferably includes a subroutine for performing a sequence number search. As is well known to those skilled in the art, various blocks in the part program on tape 30 are assigned numbers called sequence numbers which permit the identification and location of a particular area of tape simply by specifying the sequence number and winding the tape 30 until that sequence number is caused to appear. A sequence number search is readily performed by the programmable general-purpose processor 18 by means of a subroutine in which the sequence number to be searched is identified by proper execution of push buttons 66 after having set switch 718 on the panel 608 of FIG. 7 to the sequence search position. At this point the subroutine determines whether the last sequence number read was higher or lower in value than the number to be found and causes the tape reader 28 to operate either forwardly or in the reverse direction according to the results of this determination. Once the tape reader motion is started, sequence numbers are constantly read and compared to the desired number and when it is found the search is determined to be over. By this routine it is possible to identify error positions on the tape and to assume a manual control of the tool operation whenever the part program reaches that point on the tape.

The assumption of manual control over the operation of the tool 12 can, of course, be accomplished at any point during the execution of the part program. This is simply accomplished by means of the panel interrupt subroutine which occurs whenever the mode switch 718 is placed in the manual position and data is entered by way of the keyboard push-button switches 66.

In summary, it has been shown that the operation of a numerically-controlled machine tool can be advantageously accomplished with the use of a general-purpose digital data processor or computer having a memory capability by associating that computer or processor in an input/output mode with the various peripheral hardware devices which are normally found in a machine control system and the execution of a control program having a plurality of individual subroutines which are entered in accordance with a predetermined order of priority to perform all of the various data management functions which are necessary to machine tool operation. In accordance with the specific embodiment described above, various of the peripheral devices are provided with an interrupt signal generating capability and are commonly connected to an interrupt line of the processor 18 to advise the processor of a data flow condition. External wiring provides a priority system wherein devices may interrupt processor 18 according to a predetermined priority order and wherein the devices not given priority for interrupt purposes save their interrupt signal condition until they are achnowledged and serviced by way of an individual interrupt service subroutine. It is also been disclosed herein how the interrupt service capability is advantageously employed with push buttons, switches, and other hard-contact devices which enter information into the processor 18.

It is to be understood that the foregoing description is generally illustrative in character and is not to be construed as limiting the invention to the specific hardware herein before specified.

The embodiments of the invention in which an exclusive property or privilege is claimed are defined as follows:

1. A numerical control system for directing a mechanism for controlling the displacement of a controlled quantity along at least one axis comprising: a part program source for holding in storage a segmented program defining the overall parameters of a controlled function to be performed including the contour of a path to be traced by said controlled quantity, a programmable digital processor; said processor including a control program in memory; a plurality of devices including said source and at least one interpolator for transferring segments of said segmented part program toward the mechanism for direction thereof along said axis; each of said devices having a digital address; said processor being connected to each of said devices to control the data transfers thereof according to said control program.

2. A numerical control system as defined in claim 1 wherein each of said devices includes signal means for indicating the readiness of the device to transfer data, each of said signal means being connected to the processor, said control program including separate subroutines for responding to the respective signal means to carry out the data transfers.

3. A numerical control system as defined in claim 2 wherein each of said signal means includes means for transferring to said processor an address identifying the device.

4. A numerical control system as defined in claim 2 including means for responding to the signal means to carry out the data transfers according to a predetermined order of priority.

5. A numerical control system as defined in claim 4 wherein said means for responding includes logic connected intermediate the signal means and the processor.

6. A numerical control system as defined in claim 1 wherein said means for reading a stored program is a punched-tape reader for reading coded characters in sequence.

7. A numerical control system as defined in claim 2 wherein one of said devices is a group of switches for inputting data to the processor, the system further including at least one additional data input means, said control program including a subroutine for transferring data from said data input means only when none of said separate subroutines is being executed.

8. A numerical control system as defined in claim 2 wherein the processor has input, output, and interrupt channels, each of said signal means including an interrupt signal generator connected to the interrupt channel.

9. A system as defined in claim 8 wherein the combination includes interrupt control means operatively associated with the interrupt channel for accepting interrupt signals from said signal means of said devices; means responsive to an interrupt signal to determine the address of the interrupting device, and means responsive to the device address for initiating an interrupt service subroutine.

10. A system as defined in claim 9 wherein the interrupt control means includes logic means for disabling the interrupt channel during the execution of an interrupt service subroutine.

11. A system as defined in claim 10 wherein the logic means is at least partly external to the processor.

12. A system as defined in claim 10 wherein the logic means includes a bistable device, a gate connected directly in the interrupt channel, the bistable device being connected to the gate to render the gate conductive to interrupt signals when the bistable device is in one of the two possible conditions thereof.

13. A system as defined in claim 8 wherein the interrupt signal means includes OR logic means commonly connected to receive all of the interrupt signals from the data source devices to permit passage of any one such signal to the interrupt channel.

14. A system as defined in claim 13 including circuit means interconnected between the signal means for identifying the highest priority interrupting device upon interrogation by the processor.

15. A system as defined in claim 14 wherein each of the interrupt signal means includes a bistable device switchable from a first condition to a second condition in response to a data flow condition in the associated data source device, the circuit means including a plurality of coincidence gates individually associated with the signal means, and an priority signal line connected from the output channel through the coincidence gates in series from the highest priority device to the lowest priority device in order, the coincidence gates being rendered nonconductive in response to the transition of the associated bistable device from the first to the second condition whereby the priority signal passes only to the highest priority device having remained in the first condition.

16. A system as defined in claim 15 wherein the processor responds under the control program to the receipt of an interrupt signal from the tape reader to determine the presence of a parity error.

17. A system as defined in claim 8 wherein one of said devices is a clock for generating timing signals at a selected rate, the clock means being connected to the interrupt channel to generate an interrupt at said selected rate.

18. A system as defined in claim 8 including alarm means for indicating a failure of the processor to produce predetermined signals on the outpt channel within a predetermined fixed interval.

19. A system as defined in claim 8 wherein one of the devices is an interpolator for producing command pulses to the mechanism in accordance with part program data supplied thereto, a first counter of relatively small capacity connected to receive and count the pulses, and means for periodically and cumulatively transferring the contents of the first counter to a second relatively large capacity register, said register being maintained in the memory of the processor.

20. A system as defined in claim 8 including manual input means connected to the input channel for entering data into the processor memory.

21. A system as defined in claim 20 wherein the manual input means includes a plurality of switches, some of said switches being input data source devices having signal means connected to the interrupt channel.

22. A system as defined in claim 21 wherein some of said switches are position maintaining in character, and means controlled by the control program in the processor for scanning the switches for operative connection to the input channel.

23. A system as defined in claim 22 wherein the control program includes a plurality of interrupt service substantives peculiar to the scanned switches being at least approximately the lowest order of priority.

24. A system as defined in claim 21 wherein at least some of the switches are limit switches for monitoring displacement of the tool.

25. A numerical control system for a machine tool having a mechanism which effects controllable displacement along at least one tool axis comprising in combination: a part program reader for reading part program digital characters defining contiguous portions of a contoured tool path to be executed by said mechanism; an interpolator for producing digital command pulses to the mechanism in response to blocks of said characters; a plurality of switches having open and closed positions and normally residing in one of such positions; a programmable digital processor having input and output channels interconnecting the reader, interpolator, and switches for controlling the flow of data therebetween, and an interrupt line; said processor including a control program in memory; individual interrupt signal means connected to each of the reader and interpolator for producing interrupt signals in response to data flow conditions including the readiness to read a character and the need for a block, respectively; means connecting the signal means to the processor, means for identifying the signal from the signalling device of highest rank in a predetermined priority order, said means for identifying including a single signal line connected between said processor and said reader and interpolator, logic gates associated with the reader and interpolator, respectively, said signal line being connected through said gates according to said predetermined order, said signal means being connected to said logic gates to permit the signal on said line to propagate only as far as the highest priority interrupting device, means in said processor responsive to receipt of an interrupt signal from one of said individual interrupt signal means to generate an acknowledge signal, means associated with each of said reader and interpolator, respectively, and responsive to the combination of said single signal and said acknowledge signal to transfer a device address to said processor to identify the highest priority interrupting device; said processor having subroutines responsive to each of the interrupting devices to effect a flow of data toward the tool mechanism.

26. A system as defined in claim 25 wherein each of the subroutines includes the generation of a disable signal, and gate means between the signal means and the processor responsive to the disable signal to prevent the flow of interrupt signals.

27. A system as defined in claim 26 wherein each of the interrupt signal means includes a bistable device which changes state in response to a data flow condition, and means for resetting each such bistable device only after the interrupting device associated therewith has initiated the subroutine therefor whereby lower priority devices not serviced maintain the interrupt signal-producing state.

28. A system as defined in claim 27 including circuit means connected between the part program reader and the input channel for transferring an address peculiar to the reader to the processor, gate means in the circuit means, means for enabling the gate means when the processor receives an interrupt signal and, coincidently therewith, the bistable device of the reader changes state.

29. A system as defined in claim 28 including means for resetting the bistable device of the reader when the gate means is enabled.

30. A system as defined in claim 25 wherein each of the switches include first and second contacts, the first contacts being connected to the interrupt line, the second contacts being connected to the input channel through gate means, said means connecting the signal means to the processor being effective to enable the gate means.

31. A system as defined in claim 25 including means for displaying the position of the switches.

32. A system as defined in claim 31 wherein the switches are push buttons for entering numerical data into the processor.

33. A system as defined in claim 32 wherein all of the push buttons are connected to a single interrupt signal means.

34. A system as defined in claim 25 wherein the part program reader is a tape reader.

35. A method for performing a numerically controlled displacement of an element along at least one selected axis comprising the steps of: programming a digital processor to perform selected data transfer service routines in response to data transfer device identification signals; generating a reader identification signal where a part program reader is ready to read a part program character; reading part program characters under the control of the processor and during a first service routine, interpolating blocks of part program characters under control of the processor and under a second service routine, and generating an interpolator identification signal when the interpolator is ready to receive an additional block of characters.

36. The method defined in claim 35 comprising the additional step of resetting an alarm signal timer after the execution of each service routine.

37. A numerical control system for directing a mechanism for controlling the displacement of a controlled quantity along at least one axis comprising: a part program source for holding in storage a segmented program defining the overall parameters of a contoured path to be traced by said quantity, a plurality of devices including an interpolator adapted for connection to and controlled by a programmable digital processor having a control program in memory for transferring segments of said part program toward the mechanism for direction of said controlled quantity along said axis, one of said devices including means for retrieving from said source said segments of the part program defining contiguous displacements of said controlled quantity the transfer of data between said devices being controlled by the control program.

* * * * *